US012307967B2

(12) United States Patent
Li et al.

(10) Patent No.: US 12,307,967 B2
(45) Date of Patent: May 20, 2025

(54) PIXEL CIRCUIT, DISPLAY PANEL, DRIVING METHOD AND DISPLAY DEVICE

(71) Applicants: YUNNAN INVENSIGHT OPTOELECTRONICS TECHNOLOGY CO., LTD., Yunnan (CN); BOE TECHNOLOGY GROUP CO., LTD., Beijing (CN)

(72) Inventors: Dachao Li, Beijing (CN); Zhijian Zhu, Beijing (CN); Shengji Yang, Beijing (CN); Xiaochuan Chen, Beijing (CN); Junyan Yang, Beijing (CN); Pengcheng Lu, Beijing (CN); Longfei Fan, Beijing (CN)

(73) Assignees: YUNNAN INVENSIGHT OPTOELECTRONICS TECHNOLOGY CO., LTD., Yunnan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/262,699

(22) PCT Filed: May 31, 2022

(86) PCT No.: PCT/CN2022/096196

§ 371 (c)(1),
(2) Date: Jul. 24, 2023

(87) PCT Pub. No.: WO2023/230826

PCT Pub. Date: Dec. 7, 2023

(65) Prior Publication Data

US 2024/0395199 A1 Nov. 28, 2024

(51) Int. Cl.
*G09G 3/3233* (2016.01)

(52) U.S. Cl.
CPC ... *G09G 3/3233* (2013.01); *G09G 2300/0852* (2013.01); *G09G 2310/08* (2013.01); *G09G 2320/0233* (2013.01)

(58) Field of Classification Search
None
See application file for complete search history.

(56) References Cited

U.S. PATENT DOCUMENTS

| | | | |
|---|---|---|---|
| 2006/0256058 A1 | 11/2006 | Asano et al. |
| 2013/0063413 A1 | 3/2013 | Miyake |

(Continued)

FOREIGN PATENT DOCUMENTS

| | | |
|---|---|---|
| CN | 1848221 A | 10/2006 |
| CN | 1862643 A | 11/2006 |

(Continued)

OTHER PUBLICATIONS

First Non Final Office Action for U.S. Appl. No. 18/257,837, dated Sep. 11, 2024, 18 Pages.

(Continued)

*Primary Examiner* — Duane N Taylor, Jr.
(74) *Attorney, Agent, or Firm* — BROOKS KUSHMAN P.C.

(57) ABSTRACT

A pixel circuit includes a light emitting element, a driving circuit, a first energy storage circuit, a second energy storage circuit, and a writing-in control circuit; a first terminal of the first energy storage circuit is electrically connected to a control terminal of the driving circuit and a first terminal of the writing-in control circuit respectively, and a second terminal of the first energy storage circuit is electrically connected to a first terminal of driving circuit, a first terminal of the second energy storage circuit is electrically connected to a second terminal of the writing-in control (Continued)

circuit, and a second terminal of the second energy storage circuit is electrically connected to the writing-in terminal.

23 Claims, 19 Drawing Sheets

(56) References Cited

U.S. PATENT DOCUMENTS

| | | | | |
|---|---|---|---|---|
| 2013/0093653 | A1 | 4/2013 | Ota et al. | |
| 2013/0215158 | A1 | 8/2013 | Fujita et al. | |
| 2014/0285411 | A1 | 9/2014 | Tamura et al. | |
| 2015/0146129 | A1 | 5/2015 | Sugihara et al. | |
| 2015/0213758 | A1* | 7/2015 | Araki | G09G 3/3233 345/77 |
| 2016/0307499 | A1 | 10/2016 | Toyomura et al. | |
| 2018/0130412 | A1 | 5/2018 | Zhang et al. | |
| 2021/0398484 | A1 | 12/2021 | Du et al. | |
| 2022/0376024 | A1 | 11/2022 | Zheng et al. | |
| 2023/0028312 | A1 | 1/2023 | Wang et al. | |
| 2023/0031984 | A1 | 2/2023 | Wang et al. | |
| 2023/0052846 | A1 | 2/2023 | Zheng et al. | |

FOREIGN PATENT DOCUMENTS

| | | | |
|---|---|---|---|
| CN | 101536070 | A | 9/2009 |
| CN | 103065582 | A | 4/2013 |
| CN | 104064581 | A | 9/2014 |
| CN | 104821150 | A | 8/2015 |
| CN | 107767818 | A | 3/2018 |
| CN | 108932929 | A | 12/2018 |
| CN | 110634902 | A | 12/2019 |
| CN | 104871233 | B | 2/2020 |
| CN | 107665669 | B | 11/2020 |
| CN | 112053661 | A | 12/2020 |
| CN | 113950715 | A | 1/2022 |
| JP | 2012255872 | A | 12/2012 |
| WO | 2022062465 | A1 | 3/2022 |

OTHER PUBLICATIONS

Extended European Search Report for Application No. 22944165.4, dated Feb. 27, 2025, 20 Pages.

* cited by examiner

PIXEL CIRCUIT, DISPLAY PANEL, DRIVING METHOD AND DISPLAY DEVICE

CROSS-REFERENCE TO RELATED APPLICATIONS

This application is the U.S. national phase of PCT Application No. PCT/CN2022/096196 filed on May 31, 2022, which is incorporated herein by reference in its entirety.

TECHNICAL FIELD

The present disclosure relates to the field of display technology, in particular to a pixel circuit, a display panel, a driving method and a display device.

BACKGROUND

Organic Light Emitting Diode (OLED) display is one of the hotspots in the field of flat panel display, and pixel circuit design is the core technical content of OLED display. In the related art, it is impossible to provide a current-type pixel circuit capable of threshold voltage self-compensation, which is applied to an OLED display.

SUMMARY one aspect, the present disclosure provides in some embodiments a pixel circuit, including a light emitting element, a driving circuit, a first energy storage circuit, a second energy storage circuit, and a writing-in control circuit; wherein a first terminal of the first energy storage circuit is electrically connected to a control terminal of the driving circuit and a first terminal of the writing-in control circuit respectively, and a second terminal of the first energy storage circuit is electrically connected to a first terminal of driving circuit, a first terminal of the second energy storage circuit is electrically connected to a second terminal of the writing-in control circuit, and a second terminal of the second energy storage circuit is electrically connected to a writing-in terminal; the first energy storage circuit and the second energy storage circuit are used to store electrical energy; a control terminal of the writing-in control circuit is electrically connected to a first writing-in control terminal, and the writing-in control circuit is configured to control to connect or disconnect the first terminal of the first energy storage circuit and the first terminal of the second energy storage circuit under the control of a first writing-in control signal provided by the first writing-in control terminal; a second terminal of the driving circuit is electrically connected to the light emitting element, and the driving circuit is configured to generate a driving current for driving the light emitting element under the control of a potential of the control terminal of the driving circuit.

Optionally, the pixel circuit further includes a first control circuit; wherein the first control circuit is electrically connected to a first control terminal, the first terminal of the second energy storage circuit, and the second terminal of the second energy storage circuit, is configured to control to connect or disconnect the first terminal of the second energy storage circuit and the second terminal of the second energy storage circuit under the control of a first control signal provided by the first control terminal.

Optionally, the pixel circuit further includes a second control circuit; the second control circuit is electrically connected to a second control terminal, a power supply voltage terminal and the first terminal of the driving circuit, and is configured to control to connect or disconnect the power supply voltage terminal and the first terminal of the driving circuit under the control of a second control signal provided by the second control terminal.

Optionally, the second terminal of the driving circuit is electrically connected to a first electrode of the light emitting element, and a second electrode of the light emitting element is electrically connected to a first voltage terminal; the power supply voltage terminal is used to provide a power supply voltage, and the first voltage terminal is used to provide a first voltage signal; an absolute value of a voltage value of the power supply voltage is smaller than an absolute value of a voltage value of the first voltage signal.

Optionally, the pixel circuit further includes a third control circuit; wherein the second terminal of the driving circuit is electrically connected to the first electrode of the light emitting element, and the second electrode of the light emitting element is electrically connected to the first voltage terminal; the third control circuit is electrically connected to a third control terminal, a third voltage terminal and the first electrode of the light emitting element, and is configured to control to write a third voltage signal provided by the third voltage terminal into the first electrode of the light emitting element under the control of a third control signal provided by the third control terminal.

Optionally, the pixel circuit further includes a reference voltage writing-in circuit; wherein the reference voltage writing-in circuit is electrically connected to a second writing-in control terminal, a reference voltage terminal and a writing-in node respectively, and is configured to write a reference voltage provided by the reference voltage terminal into the writing-in node under the control of a second writing-in control signal provided by the second writing-in control terminal; the writing-in node is electrically connected to the control terminal of the driving circuit, or the writing-in node is electrically connected to the first terminal of the second energy storage circuit.

Optionally, the pixel circuit further includes a resistor circuit; wherein a first terminal of the resistor circuit is electrically connected to the second terminal of the driving circuit, and a second terminal of the resistor circuit is electrically connected to the first electrode of the light emitting element; the second electrode of the light emitting element is electrically connected to the first voltage terminal.

Optionally, the first energy storage circuit includes a first capacitor, and the second energy storage circuit includes a second capacitor; a first terminal of the first capacitor is electrically connected to the control terminal of the driving circuit and the first terminal of the writing-in control circuit, and a second terminal of the first capacitor is connected to the first terminal of the driving circuit; a first terminal of the second capacitor is electrically connected to the second terminal of the writing-in control circuit, and a second terminal of the second capacitor is electrically connected to the writing-in terminal; a capacitance value of the second capacitor is smaller than a capacitance value of the first capacitor.

Optionally, the writing-in control circuit comprises a first transistor; a control electrode of the first transistor is electrically connected to the first writing-in control terminal, a first electrode of the first transistor is electrically connected to the control terminal of the driving circuit, and a second electrode of the first transistor is electrically connected to the first terminal of the second energy storage circuit; a back gate electrode of the first transistor is electrically connected to the second voltage terminal.

Optionally, the first control circuit comprises a second transistor; a control electrode of the second transistor is electrically connected to the first control terminal, a first electrode of the second transistor is electrically connected to the first terminal of the second energy storage circuit, and a second electrode of the second transistor is electrically connected to the second terminal of the second energy storage circuit; a back gate electrode of the second transistor is electrically connected to the second voltage terminal.

Optionally, the reference voltage writing-in circuit comprises a third transistor; a control electrode of the third transistor is electrically connected to the second writing-in control terminal, a first electrode of the third transistor is electrically connected to the reference voltage terminal, and a second electrode of the third transistor is electrically connected to the writing-in node; a back gate electrode of the third transistor is electrically connected to the second voltage terminal.

Optionally, the second control circuit comprises a fourth transistor; the driving circuit comprises a driving transistor; a control electrode of the fourth transistor is electrically connected to the second control terminal, a first electrode of the fourth transistor is electrically connected to the power supply voltage terminal, and a second electrode of the fourth transistor is electrically connected to the first terminal of the driving circuit; a back gate electrode of the fourth transistor is electrically connected to the second voltage terminal; a control electrode of the driving transistor is the control terminal of the driving circuit, a first electrode of the driving transistor is the first terminal of the driving circuit, and a second electrode of the driving transistor is electrically connected to the second terminal of the driving circuit; a back gate electrode of the driving transistor is electrically connected to the second voltage terminal.

Optionally, the third control circuit comprises a fifth transistor; a control electrode of the fifth transistor is electrically connected to the third control terminal, a first electrode of the fifth transistor is electrically connected to the third voltage terminal, and a second electrode of the fifth transistor is electrically connected to the first electrode of the light emitting element; a back gate electrode of the fifth transistor is electrically connected to a fourth voltage terminal.

Optionally, the fifth transistor is an n-type transistor; the fourth voltage terminal is the third voltage terminal; a deep n hydrazine is arranged between the back gate electrode of the fifth transistor and a P-type base substrate to isolate the back gate electrode of the fifth transistor from the P-type base substrate; the base gate electrode of the fifth transistor and the first electrodes of the fifth transistors are all electrically connected to the third voltage terminal.

Optionally, the pixel circuit further includes an n hydrazine and a p hydrazine; a doping concentration of the n hydrazine is greater than a doping concentration of the deep n hydrazine; a ratio of a thickness of the n hydrazine to a thickness of the deep n hydrazine is greater than or equal to 0.4 and less than or equal to 0.6 a ratio of a thickness of the p hydrazine to the thickness of the deep n hydrazine is greater than or equal to 0.4 and less than or equal to 0.6.

In a second aspect, an embodiment of the present disclosure provides a pixel circuit, comprising a light emitting element, a driving circuit, a first energy storage circuit, a second energy storage circuit, and a first control circuit; a first terminal of the first energy storage circuit is electrically connected to a control terminal of the driving circuit, and a second terminal of the first energy storage circuit is electrically connected to a first terminal of the driving circuit; a first terminal of the second energy storage circuit is electrically connected to the control terminal of the driving circuit, and a second terminal of the second energy storage circuit is electrically connected to a writing-in terminal; the first energy storage circuit and the second energy storage circuit are used for storing electrical energy; the first control circuit and the second energy storage circuit are connected in parallel, and the first control circuit is configured to control to connect or disconnect the first terminal of the second energy storage circuit the and the second terminal of the second energy storage circuit under the control of a first control signal provided by a first control terminal; a second terminal of the driving circuit is electrically connected to a light emitting element, and the driving circuit is configured to generate a driving current for driving the light emitting element under the control of a potential of the control terminal of the driving circuit Optionally, the control terminal of the first control circuit is electrically connected to the first control terminal, and the first terminal of the first control circuit is connected to the first terminal of the second energy storage circuit, the second terminal of the first control circuit is electrically connected to the second terminal of the second energy storage circuit.

Optionally, the pixel circuit further includes a writing-in control circuit; wherein the writing-in control circuit is arranged between the first energy storage circuit and the second energy storage circuit; a control terminal of the writing-in control circuit is electrically connected to a first writing-in control terminal, a first terminal of the writing-in control circuit is electrically connected to the first terminal of the first energy storage circuit, and a second terminal of the writing-in control circuit is electrically connected to the first terminal of the second energy storage circuit, and the writing-in control circuit is configured to control to connect or disconnect the first terminal of the first energy storage circuit and the first terminal of the second energy storage circuit under the control of a first writing-in control signal provided by the first writing-in control terminal.

Optionally, the pixel circuit further includes a second control circuit; wherein the second control circuit is electrically connected to a second control terminal, a power supply voltage terminal and the first terminal of the driving circuit, and is configured to control to connect or disconnect the power supply voltage terminal and the first terminal of the driving circuit under the control of a second control signal provided by the second control terminal.

Optionally, the second terminal of the driving circuit is electrically connected to a first electrode of the light emitting element, and a second electrode of the light emitting element is electrically connected to a first voltage terminal; the power supply voltage terminal is used to provide a power supply voltage, and the first voltage terminal is used to provide a first voltage signal; an absolute value of a voltage value of the power supply voltage is smaller than an absolute value of a voltage value of the first voltage signal.

Optionally, the pixel circuit further includes a third control circuit; wherein the second terminal of the driving circuit is electrically connected to the first electrode of the light emitting element, and the second electrode of the light emitting element is electrically connected to the first voltage terminal; the third control circuit is electrically connected to a third control terminal, a third voltage terminal and the first electrode of the light emitting element, and is configured to control to write a third voltage signal provided by the third voltage terminal into the first electrode of the light emitting element under the control of a third control signal provided by the third voltage terminal.

Optionally, the pixel circuit further includes a reference voltage writing-in circuit; wherein the reference voltage writing-in circuit is electrically connected to a second writing-in control terminal, a reference voltage terminal and a writing-in node respectively, and is configured to write a reference voltage provided by the reference voltage terminal into the writing-in node under the control of a second writing-in control signal provided by the second writing-in control terminal; the writing-in node is electrically connected to the control terminal of the driving circuit, or the writing-in node is electrically connected to the first terminal of the second energy storage circuit.

Optionally, the pixel circuit further includes a resistor circuit; wherein a first terminal of the resistor circuit is electrically connected to the second terminal of the driving circuit, and a second terminal of the resistor circuit is electrically connected to the first electrode of the light emitting element; the second electrode of the light emitting element is electrically connected to the first voltage terminal.

Optionally, the first tank circuit comprises a first capacitor, and the second tank circuit comprises a second capacitor; a first terminal of the first capacitor is electrically connected to the control terminal of the driving circuit and the first terminal of the writing-in control circuit, and a second terminal of the first capacitor is connected to the first terminal of the driving circuit; a first terminal of the second capacitor is electrically connected to the second terminal of the writing-in control circuit, and a second terminal of the second capacitor is electrically connected to the writing-in terminal; a capacitance value of the second capacitor is smaller than a capacitance value of the first capacitor.

Optionally, the writing-in control circuit comprises a first transistor; a control electrode of the first transistor is electrically connected to the first writing-in control terminal, a first electrode of the first transistor is electrically connected to the control terminal of the driving circuit, and a second electrode of the first transistor is electrically connected to the first terminal of the second energy storage circuit; a back gate electrode of the first transistor is electrically connected to the second voltage terminal.

Optionally, the first control circuit comprises a second transistor; a control electrode of the second transistor is electrically connected to the first control terminal, a first electrode of the second transistor is electrically connected to the first terminal of the second energy storage circuit, and a second electrode of the second transistor is electrically connected to the second terminal of the second energy storage circuit; a back gate electrode of the second transistor is electrically connected to the second voltage terminal.

Optionally, the reference voltage writing-in circuit comprises a third transistor; a control electrode of the third transistor is electrically connected to the second writing-in control terminal, a first electrode of the third transistor is electrically connected to the reference voltage terminal, and a second electrode of the third transistor is electrically connected to the writing-in node; a back gate electrode of the third transistor is electrically connected to the second voltage terminal.

Optionally, the second control circuit comprises a fourth transistor; the driving circuit comprises a driving transistor; a control electrode of the fourth transistor is electrically connected to the second control terminal, a first electrode of the fourth transistor is electrically connected to the power supply voltage terminal, and a second electrode of the fourth transistor is electrically connected to the first terminal of the driving circuit; a back gate electrode of the fourth transistor is electrically connected to the second voltage terminal; a control terminal of the driving transistor is the control terminal of the driving circuit, a first electrode of the driving transistor is the first terminal of the driving circuit, and a second electrode of the driving transistor is the second terminal of the driving circuit; a back gate electrode of the driving transistor is electrically connected to the second voltage terminal.

Optionally, the third control circuit comprises a fifth transistor; a control electrode of the fifth transistor is electrically connected to the third control terminal, a first electrode of the fifth transistor is electrically connected to the third voltage terminal, and a second electrode of the fifth transistor is electrically connected to the first electrode of the light emitting terminal; a back gate electrode of the fifth transistor is electrically connected with a fourth voltage terminal.

Optionally, the fifth transistor is an n-type transistor; the fourth voltage terminal is the third voltage terminal; a deep n hydrazine is arranged between the back gate electrode of the fifth transistor and a P-type base substrate to isolate the back gate electrode of the fifth transistor from the P-type base substrate; the back gate electrode of the fifth transistor and the first electrode of the fifth transistor are both electrically connected to the reset voltage terminal.

Optionally, the pixel circuit further includes an n hydrazine and a p hydrazine; a doping concentration of the n hydrazine is greater than a doping concentration of the deep n hydrazine; a ratio of a thickness of the n hydrazine to a thickness of the deep n hydrazine is greater than or equal to 0.4 and less than or equal to 0.6; a ratio of a thickness of the p hydrazine to the thickness of the deep n hydrazine is greater than or equal to 0.4 and less than or equal to 0.6.

In a third aspect, an embodiment of the present disclosure provides a display panel including a plurality of rows and a plurality of columns of pixel circuits.

Optionally, the display panel further includes a plurality of columns of data lines; wherein writing-in terminals of pixel circuits in a same column are electrically connected to data lines in a same column, and the second energy storage circuit includes a second capacitor; the second capacitor is a parasitic capacitor between the data line and a signal line arranged on a same layer as the second capacitor.

Optionally, the display panel includes a valid display area and a peripheral area, and the peripheral area surrounds the valid display area; the pixel circuit includes a first control circuit; the first control circuit and the second energy storage circuit are arranged in the peripheral area, and components included in the pixel circuit other than the first control circuit and the second energy storage circuit are arranged in the valid display area.

Optionally, a column of pixel circuits included in the display panel share one first control circuit and one second energy storage circuit; the display panel includes M rows and N columns of pixel circuits, wherein M and N are integers greater than 1; the display panel includes N shared units; an nth shared unit includes an nth first control circuit and an nth second energy storage circuit; in the valid display area of the display panel, a pixel circuit in the mth row and nth column includes a light emitting element in the mth row and nth column, a driving circuit in the mth row and mth column, a first energy storage circuit in the mth row and nth column, a writing-in control circuit in the mth row and nth column and a first control circuit in the mth row and nth column; the nth first control circuit is electrically connected to the first control terminal, a first terminal of the nth second energy storage circuit, and a second terminal of the nth second energy storage circuit, is configured to control to connect or disconnect the first terminal of the nth second energy storage circuit and the second terminal of the nth second energy storage circuit under the control of the first control signal provided by the first control terminal; the writing-in control circuit in the mth row and nth column is electrically connected to the first writing-in control terminal, the control terminal of driving circuit in the mth row and nth column and the first terminal of the nth second energy storage circuit respectively, is configured to control to connect or disconnect the control terminal of the driving circuit in the mth row and nth column and the first terminal of the nth second energy storage circuit under the control of the writing-in control signal provided by the first writing-in control terminal; the second terminal of the nth second energy storage circuit is electrically connected to the nth writing-in terminal; the nth second energy storage circuit is used to store electric energy; n is a positive integer less than or equal to N, and m is a positive integer less than or equal to M.

In a fourth aspect, an embodiment of the present disclosure provides a driving method applied to the pixel circuit, including: controlling, by the writing-in control circuit, to connect or disconnect the first terminal of the first energy storage circuit and the first terminal of the second energy storage circuit under the control of the first writing-in control signal; generating, by the driving circuit, a driving current for driving the light emitting element under the control of the potential of the control terminal of the driving circuit.

Optionally, a display period of the pixel circuit includes an initialization phase, a self-discharge phase, a data preparation phase, a potential control phase, a data writing-in phase, and a light emitting phase that are set successively; the driving method includes: in the initialization phase, the self-discharging phase and the data writing-in phase, controlling, by the writing-in control circuit, to connect the first terminal of the first energy storage circuit and the first terminal of the second energy storage circuit under the control of the first writing-in control signal; in the data preparation phase, the potential control phase and the light emitting phase, controlling, by the writing-in control circuit, to disconnect the first terminal of the first energy storage circuit from the first terminal of the second energy storage circuit under the control of the first writing-in control signal.

Optionally, the pixel circuit further comprises a first control circuit; the driving method further comprises: in the initialization phase, the self-discharging phase, the data preparation phase and the light emitting phase, controlling, by the first control circuit, to connect the first terminal of the second energy storage circuit and the second terminal of the second energy storage circuit under the control of the first control signal; in the potential control phase and the data writing-in phase, controlling, by the first control circuit, to connect the first terminal of the second energy storage circuit and the second terminal of the second energy storage circuit under the control of the first control signal.

In a fifth aspect, an embodiment of the present disclosure provides a driving method applied to the pixel circuit, the driving method comprising: controlling, by the first control circuit, to connect or disconnect the first terminal of the second energy storage circuit and the second terminal of the second energy storage circuit under the control of the first control signal; generating, by the driving circuit, a driving current for driving the light emitting element under the control of the potential of the control terminal of the driving circuit.

Optionally, a display period of the pixel circuit includes an initialization phase, a self-discharge phase, a data preparation phase, a potential control phase, a data writing-in phase, and a light emitting phase that are set successively; the driving method includes: in the initialization phase, the self-discharging phase, the data preparation phase and the light emitting phase, controlling, by the first control circuit, to connect the first terminal of the second energy storage circuit and the second terminal of the second energy storage circuit under the control of the first control signal; in the potential control phase and the data writing-in phase, controlling, by the first control circuit, to disconnect the first terminal of the second energy storage circuit and the second terminal of the second energy storage circuit under the control of the first control signal.

Optionally, the pixel circuit further comprises a writing-in control circuit; the driving method further comprises: in the initialization phase, the self-discharging phase and the data writing-in phase, controlling, by the writing-in control circuit, to connect the first terminal of the first energy storage circuit and the first terminal of the second energy storage circuit under the control of the first writing-in control signal; in the data preparation phase, the potential control phase and the light emitting phase, controlling, by the writing-in control circuit, to disconnect the first terminal of the first energy storage circuit and the first terminal of the second energy storage circuit under the control of the first writing-in control signal.

In a sixth aspect, an embodiment of the present disclosure provides a display device comprising the display panel.

Optionally, the display panel comprises a first silicon substrate, and a pixel circuit and a gate driving circuit arranged on the first silicon substrate; the display device further includes a second silicon substrate, and a display driver chip arranged on the second silicon substrate.

Optionally, an area of the first silicon substrate is larger than an area of the second silicon substrate; a minimum width of signal lines included in the display panel is greater than a width of signal lines included in the display driver chip.

DETAILED DESCRIPTION

Figure 1:
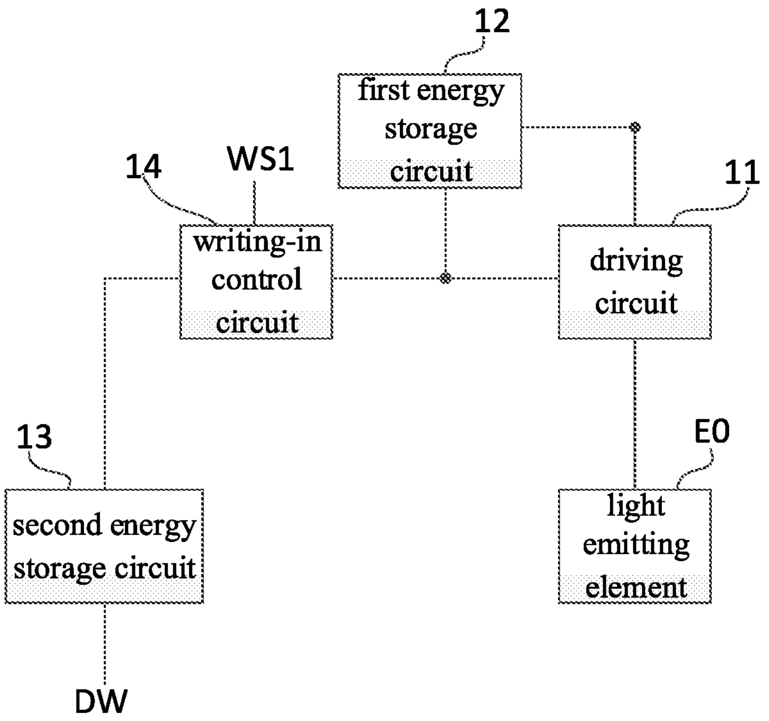
FIG. 1 is a structural diagram of a pixel circuit according to at least one embodiment of the present disclosure.

The following will clearly and completely describe the technical solutions in the embodiments of the present disclosure with reference to the accompanying drawings in the embodiments of the present disclosure. Apparently, the described embodiments are only some of the embodiments of the present disclosure, not all of them. Based on the embodiments in the present disclosure, all other embodiments obtained by persons of ordinary skill in the art without making creative work belong to the protection scope of the present disclosure.

The transistors used in all embodiments of the present disclosure may be thin film transistors or field effect transistors or other devices with the same characteristics. In the embodiments of the present disclosure, in order to distinguish the two electrodes of the transistor other than the gate electrode, one electrode is called the first electrode, and the other electrode is called the second electrode.

In actual operation, when the transistor is a thin film transistor or a field effect transistor, the first electrode may be a drain electrode, and the second electrode may be a source electrode; or, the first electrode may be a source electrode, the second electrode may be a drain electrode.

The pixel circuit described in the embodiment of the present disclosure includes a light emitting element, a driving circuit, a first energy storage circuit, a second energy storage circuit, and a writing-in control circuit;

A first terminal of the first energy storage circuit is electrically connected to a control terminal of the driving circuit and a first terminal of the writing-in control circuit respectively, and a second terminal of the first energy storage circuit is electrically connected to a first terminal of driving circuit, a first terminal of the second energy storage circuit is electrically connected to a second terminal of the writing-in control circuit, and a second terminal of the second energy storage circuit is electrically connected to the writing-in terminal; the first energy storage circuit and the second energy storage circuit are used to store electrical energy;

A control terminal of the writing-in control circuit is electrically connected to a first writing-in control terminal, and the writing-in control circuit is used to control to connect or disconnect the first terminal of the first energy storage circuit and the first terminal of the second energy storage circuit under the control of the first writing-in control signal provided by the first writing-in control terminal;

A second terminal of the driving circuit is electrically connected to the light emitting element, and the driving circuit is configured to generate a driving current for driving the light emitting element under the control of a potential of the control terminal of the driving circuit.

In the pixel circuit described in the embodiment of the present disclosure, the writing-in control circuit is arranged between the first energy storage circuit and the second energy storage circuit, and the writing-in control circuit controls to connect or disconnect the first terminal of the first energy storage circuit and the first terminal of the second energy storage circuit under the control of the first writing-in control signal; the first energy storage circuit and the second energy storage circuit can control the potential of the control terminal of the driving circuit by dividing the voltage; the driving circuit generates a driving current for driving the light emitting element under the control of the potential of the control terminal of the driving circuit.

When the pixel circuit described in the embodiments of the present disclosure is in operation, the capacitance value of the first capacitor included in the first energy storage circuit and the capacitance value of the second capacitor included in the second energy storage circuit can be controlled and adjusted, so that the driving current for controlling the driving circuit to drive the light emitting element to emit light is not related to the threshold voltage of the driving transistor included in the driving circuit.

The embodiments of the present disclosure can provide a current-type pixel circuit with a simple structure and capable of performing threshold voltage self-compensation, which is applied to an Organic Light Emitting Diode (OLED) display.

As shown in FIG. 1, the pixel circuit described in at least one embodiment of the present disclosure includes a light emitting element E0, a driving circuit 11, a first energy storage circuit 12, a second energy storage circuit 13, and a writing-in control circuit 14;

The first terminal of the first energy storage circuit 12 is electrically connected to the control terminal of the driving circuit 11 and the first terminal of the writing-in control circuit 14 respectively, and the second terminal of the first energy storage circuit 12 is electrically connected to the first terminal of the driving circuit 11; the first terminal of the second energy storage circuit 13 is electrically connected to the second terminal of the writing-in control circuit 14, and the second terminal of the second energy storage circuit 13 is electrically connected to the writing-in terminal DW; the first energy storage circuit 12 and the second energy storage circuit 13 are used to store electrical energy;

The control terminal of the writing-in control circuit 14 is electrically connected to the first writing-in control terminal WS1, and the writing-in control circuit 14 is used to control to connect or disconnect the first terminal of the first energy storage circuit 12 and the first terminal of the second energy storage circuit 13 under the control of the first writing-in control signal provided by the first writing-in control terminal WS1;

The second terminal of the driving circuit 11 is electrically connected to the light emitting element E0, and the driving circuit 11 is used to generate a driving current to drive the light emitting element E0 under the control of the potential of the control terminal of the driving circuit.

When the pixel circuit shown in FIG. 1 of at least one embodiment of the present disclosure is working, the writing-in control circuit 14 controls to connect or disconnect the control terminal of the driving circuit 11 and the first terminal of the second energy storage circuit 13, and the first energy storage circuit 12 and the second energy storage circuit 13 are used to divide the voltage of the data voltage, which expands the dynamic range of the data voltage and is beneficial to the design of the digital-to-analog converter (DAC) in the source driver and the uniformity of the data line output.

When the pixel circuit shown in FIG. 1 of at least one embodiment of the present disclosure is in operation, the display period of the pixel circuit may include an initialization phase, a self-discharge phase, a data preparation phase, a potential control phase, a data writing-in phase and a light emitting phase that are set successively;

In the initialization phase, the self-discharge phase and the data writing-in phase, the writing-in control circuit 13 controls to connect the first terminal of the first energy storage circuit 12 and the first terminal of the second energy storage circuit 13 under the control of the first writing-in control signal;

In the data preparation phase, the potential control phase, and the light emitting phase, the writing-in control circuit 14 controls to disconnect the first terminal of the first energy storage circuit 12 from the first terminal of the second energy storage circuit 13 under the control of the first writing-in control signal.

Figure 2:
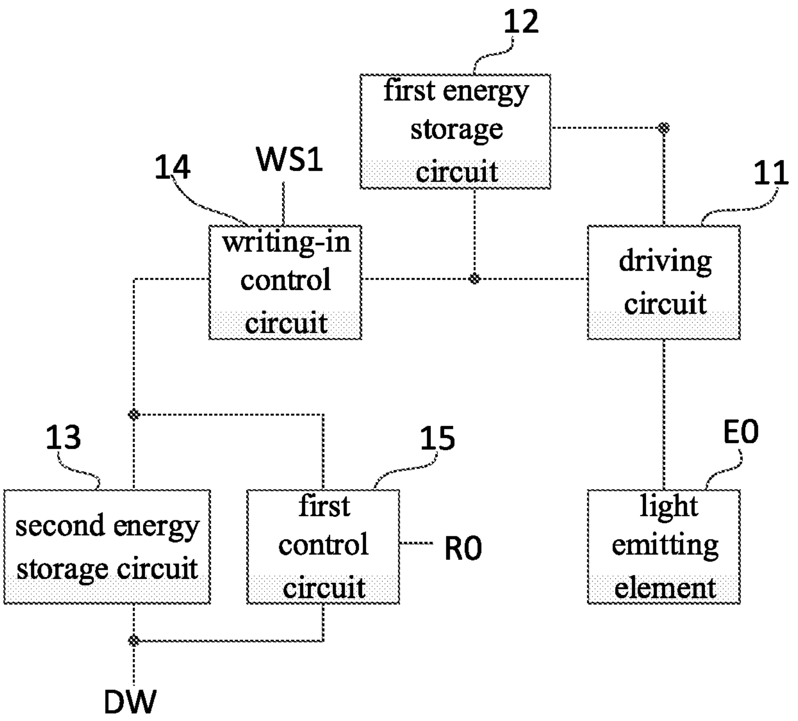
FIG. 2 is a structural diagram of a pixel circuit according to at least one embodiment of the present disclosure.

As shown in FIG. 2, on the basis of at least one embodiment of the pixel circuit shown in FIG. 1, the pixel circuit described in at least one embodiment of the present disclosure may further include a first control circuit 15;

The first control circuit 15 is electrically connected to the first control terminal R0, the first terminal of the second energy storage circuit 13, and the second terminal of the second energy storage circuit 13, is configured to control to connect or disconnect the first terminal of the second energy storage circuit 13 and the second terminal of the second energy storage circuit 13 under the control of the first control signal provided by the first control terminal R0.

When the pixel circuit shown in FIG. 2 of at least one embodiment of the present disclosure is working, the display period may include an initialization phase, a self-discharge phase, a data preparation phase, a potential control phase, a data writing-in phase, and a light emitting phase set successively;

In the initialization phase, the first control circuit 15 controls to connect the first terminal of the second energy storage circuit 13 and the second terminal of the second energy storage circuit 13 under the control of the first control signal, to reset the second energy storage circuit 13;

In the self-discharge phase and the data preparation phase, the first control circuit 15 controls to connect the first terminal of the second energy storage circuit 13 and the second terminal of the second energy storage circuit 13 under the control of the first control signal, to remove the charge stored in the second energy storage circuit 13, so that the first energy storage circuit 12 maintains the gate-source voltage of the driving transistor included in the driving circuit 11 in the data preparation phase to be the same as the self-discharge phase;

In the potential control stage, the first control circuit 15 controls to disconnect the first terminal of the second energy storage circuit 13 from the second terminal of the second energy storage circuit 13 under the control of the first control signal, but because the writing-in control circuit 14 controls to disconnect the first terminal of the first energy storage circuit 12 and the first terminal of the second energy storage circuit 13 under the control of the first writing-in control signal, so the second energy storage circuit 13 does not store charges, and the first energy storage circuit 12 keeps the gate-source voltage of the driving transistor included in the driving circuit 11 to be the same as the data preparation phase;

In the data writing-in phase, the first control circuit 15 controls to disconnect the first terminal of the second energy storage circuit 13 from the second terminal of the second energy storage circuit 13 under the control of the first control signal, the writing-in control circuit 14 controls to connect the first terminal of the first energy storage circuit 12 and the first terminal of the second energy storage circuit 13 under the control of the first writing-in control signal, the first energy storage circuit 12 and the second energy storage circuit 13 redistribute charges to change the gate-source voltage of the driving transistor;

In the light emitting phase, the first control circuit 15 controls to connect the first terminal of the second energy storage circuit 13 and the second terminal of the second energy storage circuit 13 under the control of the first control signal, the writing-in control circuit 14 controls to disconnect the first terminal of the first energy storage circuit 12 from the first terminal of the second energy storage circuit 13 under the control of the first writing-in control signal, the driving transistor drives the light emitting element to emit light.

The pixel circuit described in at least one embodiment of the present disclosure may further include a second control circuit;

The second control circuit is electrically connected to the second control terminal, the power supply voltage terminal and the first terminal of the driving circuit, and is used to control to connect or disconnect the power supply voltage terminal and the first terminal of the driving circuit under the control of the second control signal provided by the second control terminal.

In a specific implementation, the second control circuit can control to connect or disconnect the power supply voltage terminal and the first terminal of the driving circuit under the control of the second control signal, so as to control the self-discharge threshold compensation process of the driving transistor included in the driving circuit.

In at least one embodiment of the present disclosure, the second terminal of the driving circuit is electrically connected to the first electrode of the light emitting element, and the second electrode of the light emitting element is electrically connected to the first voltage terminal;

The power supply voltage terminal is used to provide a power supply voltage, and the first voltage terminal is used to provide a first voltage signal;

The absolute value of the voltage value of the power supply voltage is smaller than the absolute value of the voltage value of the first voltage signal.

Optionally, the voltage value range of the power supply voltage may be greater than or equal to 1V and less than or equal to 3V, and the voltage value range of the first voltage signal may be greater than or equal to −8V and less than or equal to −5V, but not limited thereto.

Figure 3:
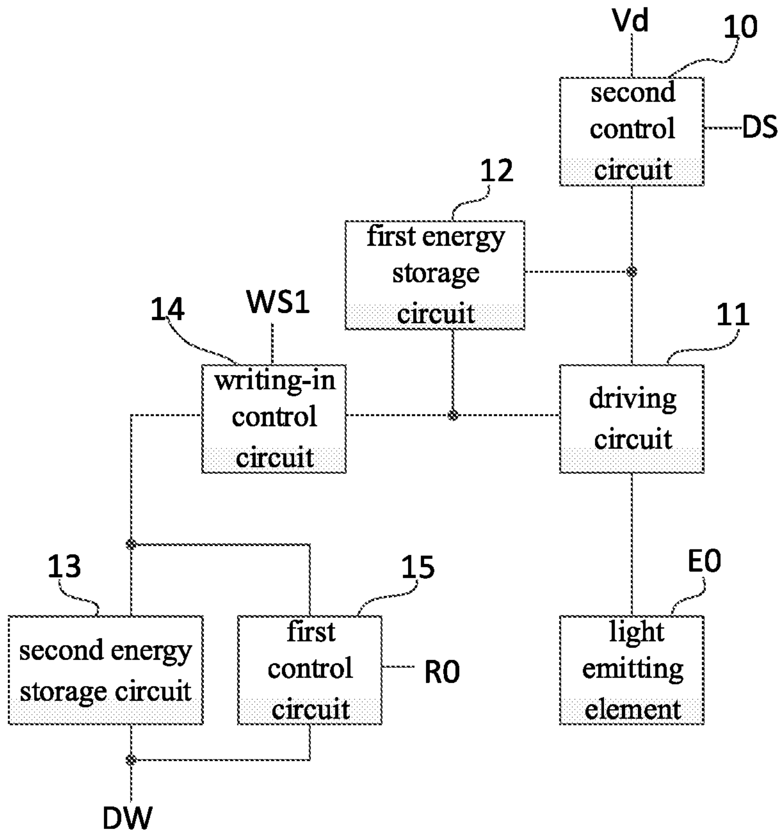
FIG. 3 is a structural diagram of a pixel circuit according to at least one embodiment of the present disclosure.

As shown in FIG. 3, on the basis of at least one embodiment of the pixel circuit shown in FIG. 2, the pixel circuit described in at least one embodiment of the present disclosure further includes a second control circuit 10;

The second control circuit 10 is electrically connected to the second control terminal DS, the power supply voltage terminal Vd, and the first terminal of the driving circuit 11, respectively, is configured to control to connect or disconnect the power supply voltage terminal Vd and the first terminal of the driving circuit 11 under the control of the second control signal provided by the second control terminal DS;

The second terminal of the driving circuit 11 is electrically connected to the first electrode of the light emitting element E0, and the second electrode of the light emitting element E0 is electrically connected to the first voltage terminal V1.

In at least one embodiment shown in FIG. 3, the first voltage terminal V1 may be a low voltage terminal, but not limited thereto.

In at least one embodiment of the present disclosure, the pixel circuit further includes a third control circuit; the second terminal of the driving circuit is electrically connected to the first electrode of the light emitting element, and the second electrode of the light emitting element is electrically connected to the first voltage terminal;

The third control circuit is electrically connected to the third control terminal, the third voltage terminal and the first electrode of the light emitting element, and is used to control to write the third voltage signal provided by the third voltage terminal into the first electrode of the light emitting element under the control of the third control signal provided by the third control terminal.

In a specific implementation, the third control circuit is used to write the third voltage signal into the first electrode of the light emitting element during the non-light emitting phase under the control of the third control signal, so that the difference between the potential of the first electrode of the light emitting element and the potential of the second electrode of the light emitting element is smaller than the turn-on voltage of the light emitting element, so as to control the light emitting element not to emit light.

When the pixel circuit described in at least one embodiment of the present disclosure is working, the third control circuit can reset the potential of the first electrode of the light emitting element, and can also play a shunt function during the light emitting phase to improve the driving accuracy of tiny currents of the silicon-based OLED.

Optionally, the light emitting element may be an organic light emitting diode, the first electrode of the light emitting element is the anode of the organic light emitting diode, and the second electrode of the light emitting element is the cathode of the organic light emitting diode, but not in this way limit.

Figure 4:
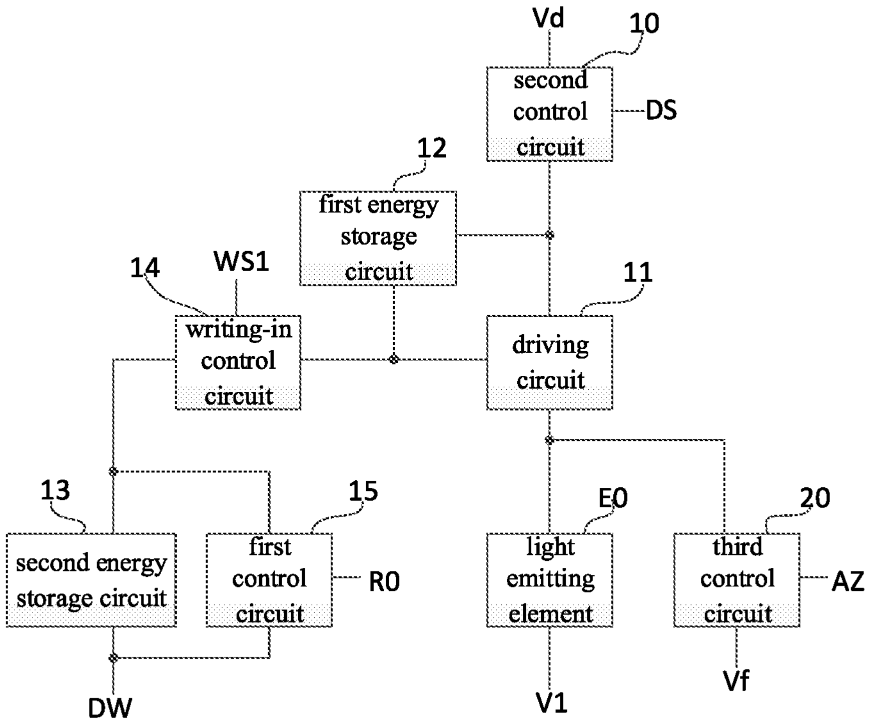
FIG. 4 is a structural diagram of a pixel circuit according to at least one embodiment of the present disclosure.

As shown in FIG. 4, on the basis of at least one embodiment of the pixel circuit shown in FIG. 3, the pixel circuit described in at least one embodiment of the present disclosure further includes a third control circuit 20;

The third control circuit 20 is electrically connected to the third control terminal AZ, the third voltage terminal Vf and the first electrode of the light emitting element E0 respectively, and is configured to control to write the third voltage signal provided by the third voltage terminal Vf into the first electrode of the light emitting element E0 under the control of the second control signal provided by the third control terminal AZ.

When at least one embodiment of the pixel circuit shown in FIG. 4 of the present disclosure is working, the third control circuit 20 is used to write the third voltage signal provided by the third voltage terminal Vf into the first electrode of the light emitting element E0 under the control of the third control signal during the non-light emitting phase, so that the difference between the potential of the first electrode of the light emitting element E0 and the potential of the second electrode of the light emitting element E0 is smaller than that of the turn-on voltage of light emitting element E0, to control the light emitting element E0 not to emit light.

In at least one embodiment of the present disclosure, the first voltage terminal V1 may be a low voltage terminal, but not limited thereto.

Optionally, the pixel circuit described in at least one embodiment of the present disclosure may further include a reference voltage writing-in circuit;

The reference voltage writing-in circuit is electrically connected to the second writing-in control terminal, the reference voltage terminal and the writing-in node respectively, and is used to write the reference voltage provided by the reference voltage terminal into the writing-in node under the control of the second writing-in control signal provided by the second writing-in control terminal, so as to control the potential of the writing-in node;

The writing-in node is electrically connected to the control terminal of the driving circuit, or the writing-in node is electrically connected to the first terminal of the second energy storage circuit.

Figure 5:
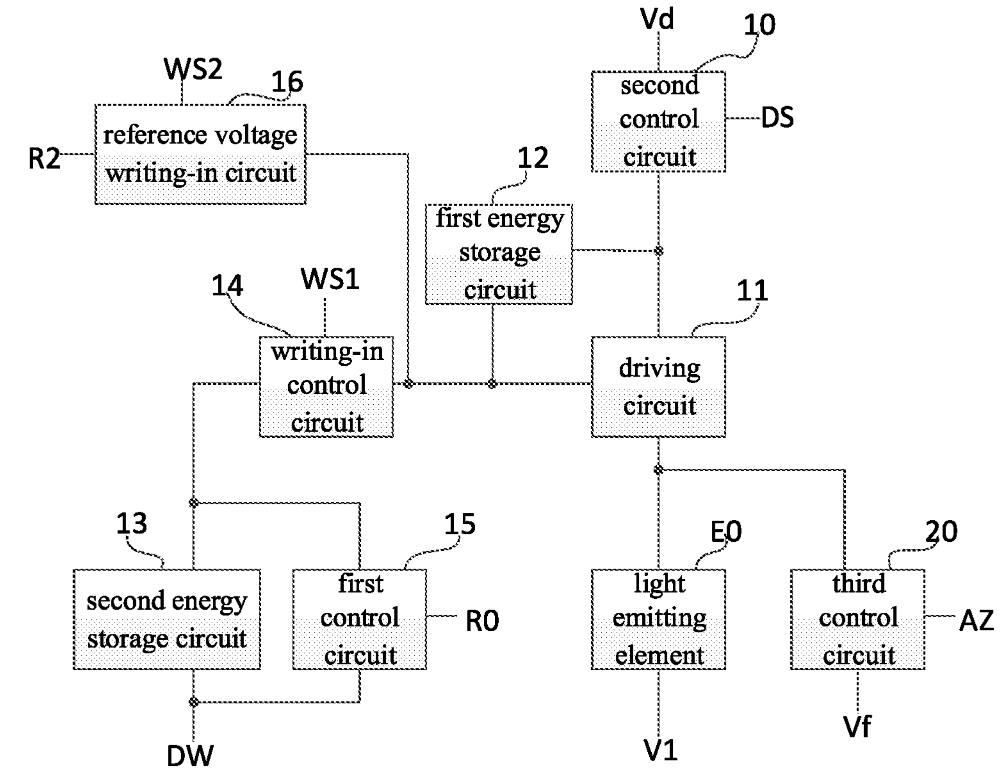
FIG. 5 is a structural diagram of a pixel circuit according to at least one embodiment of the present disclosure.

As shown in FIG. 5, on the basis of at least one embodiment of the pixel circuit shown in FIG. 4, the pixel circuit described in at least one embodiment of the present disclosure may further include a reference voltage writing-in circuit 16;

The reference voltage writing-in circuit is respectively electrically connected to the second writing-in control terminal WS2, the reference voltage terminal R2 and the control terminal of the driving circuit 11, and is configured to write the reference voltage Vref provided by the reference voltage terminal R2 into the control terminal of the driving circuit 11 under the control of the second writing-in control signal provided by the second writing-in control terminal WS2, so as to control the potential of the control terminal of the driving circuit 11.

Figure 6:
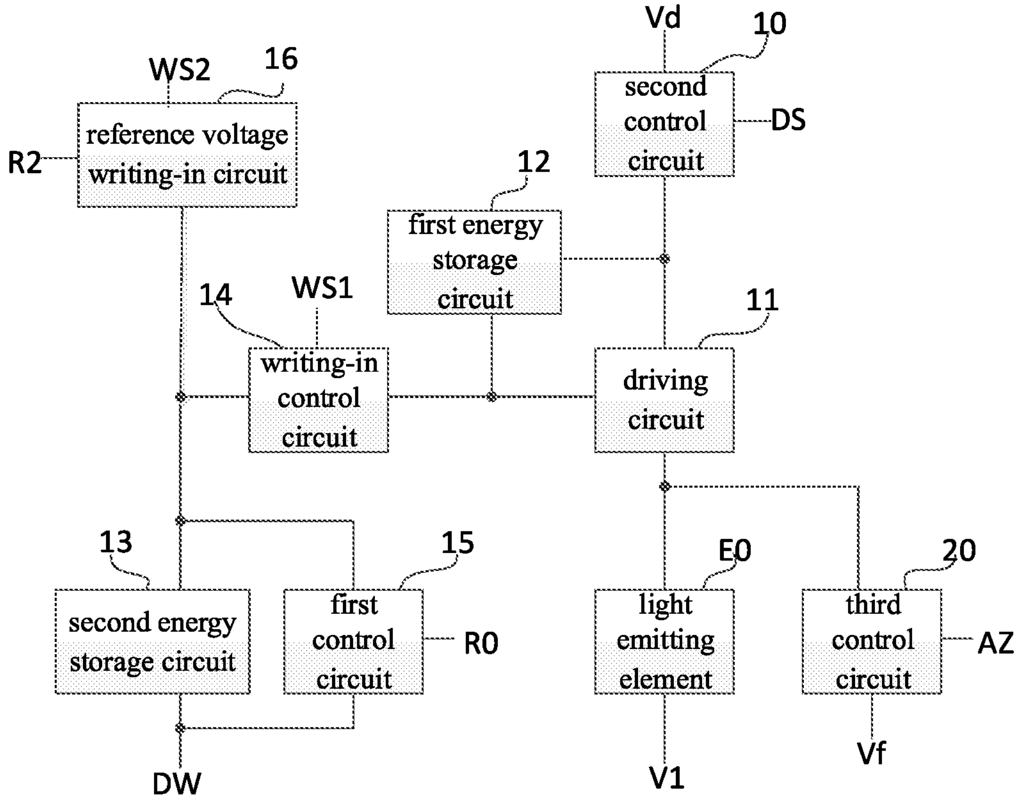
FIG. 6 is a structural diagram of a pixel circuit according to at least one embodiment of the present disclosure.

As shown in FIG. 6, on the basis of at least one embodiment of the pixel circuit shown in FIG. 4, the pixel circuit described in at least one embodiment of the present disclosure may further include a reference voltage writing-in circuit 16;

The reference voltage writing-in circuit 16 is electrically connected to the second writing-in control terminal WS2, the reference voltage terminal R2 and the first terminal of the second energy storage circuit 13, respectively, is configured to write the reference voltage Vref provided by the reference voltage terminal R2 into the first terminal of the second energy storage circuit 13 under the control of the second writing-in control signal provided by the second writing-in control terminal WS2, to control the potential of the first terminal of the second energy storage circuit 13.

Optionally, the pixel circuit described in at least one embodiment of the present disclosure may further include a resistor circuit;

A first terminal of the resistor circuit is electrically connected to the second terminal of the driving circuit, and a second terminal of the resistor circuit is electrically connected to the first electrode of the light emitting element, so as to prevent the short circuit between the first electrode of the light emitting element and the second electrode of the light emitting element;

The second electrode of the light emitting element is electrically connected to the first voltage terminal.

In at least one embodiment of the present disclosure, the resistor circuit may include a first resistor, but not limited thereto.

Figure 7:
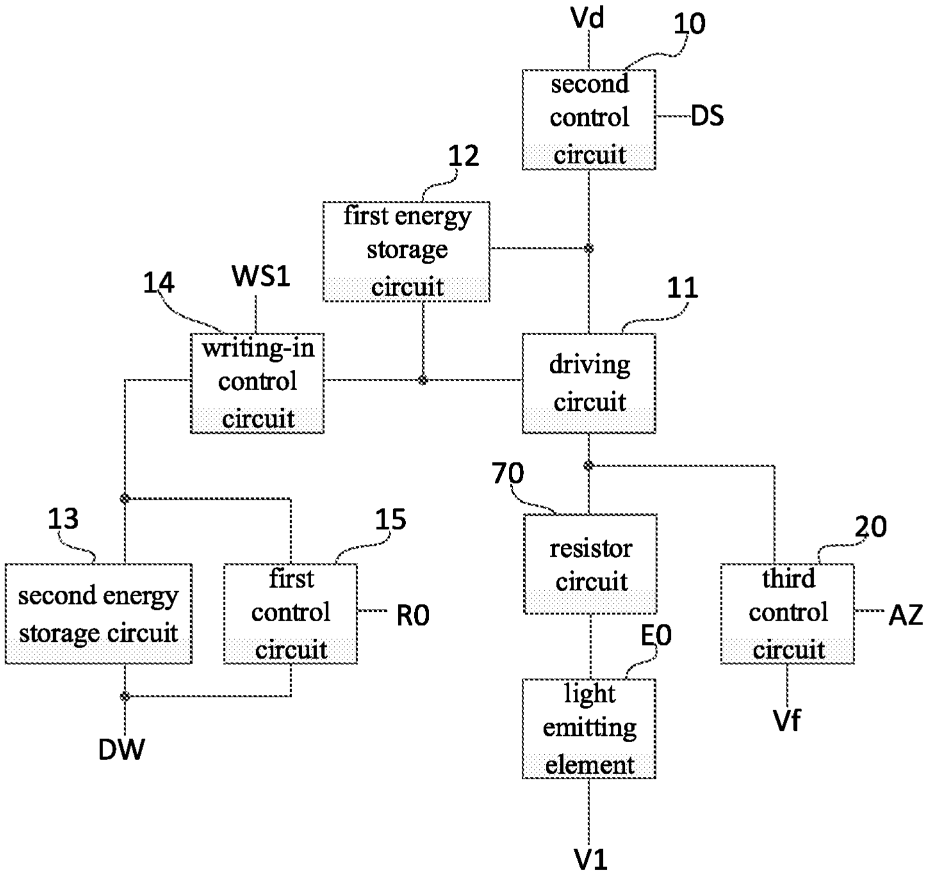
FIG. 7 is a structural diagram of a pixel circuit according to at least one embodiment of the present disclosure.

As shown in FIG. 7, on the basis of at least one embodiment of the pixel circuit shown in FIG. 4, the pixel circuit described in at least one embodiment of the present disclosure may further include a resistor circuit 70;

The first terminal of the resistor circuit 70 is electrically connected to the second terminal of the driving circuit 11, and the second terminal of the resistor circuit 70 is electrically connected to the first electrode of the light emitting element E0, so as to prevent the short circuit between the first electrode of light emitting element E0 and the second electrode of the light emitting element E0.

Optionally, the first energy storage circuit includes a first capacitor; the second energy storage circuit includes a second capacitor; the writing-in control circuit includes a first transistor;

A first terminal of the first capacitor is electrically connected to the control terminal of the driving circuit and the first terminal of the writing-in control circuit, and the second terminal of the first capacitor is connected to the first terminal of the driving circuit;

A first terminal of the second capacitor is electrically connected to the second terminal of the writing-in control circuit, and a second terminal of the second capacitor is electrically connected to the writing-in terminal;

A capacitance value of the second capacitor is smaller than a capacitance value of the first capacitor.

In at least one embodiment of the present disclosure, since the first capacitor needs to control the potential of the driving transistor in the driving circuit within one frame, the capacitance value of the first capacitor needs to be set larger, and the capacitance value of the first capacitor is set to be greater than the capacitance value of the second capacitor.

Optionally, the writing-in control circuit includes a first transistor;

A control electrode of the first transistor is electrically connected to the first writing-in control terminal, a first electrode of the first transistor is electrically connected to the control terminal of the driving circuit, and a second electrode of the first transistor is electrically connected to the first terminal of the second capacitor; a back gate electrode of the first transistor is electrically connected to the second voltage terminal;

A second terminal of the second capacitor is electrically connected to the writing-in terminal.

Optionally, the first control circuit includes a second transistor;

A control electrode of the second transistor is electrically connected to the first control terminal, a first electrode of the second transistor is electrically connected to the first terminal of the second energy storage circuit, and a second electrode of the second transistor is electrically connected to the second terminal of the second energy storage circuit; a back gate electrode of the second transistor is electrically connected to the second voltage terminal.

Optionally, the reference voltage writing-in circuit includes a third transistor;

A control electrode of the third transistor is electrically connected to the second writing-in control terminal, a first electrode of the third transistor is electrically connected to the reference voltage terminal, and a second electrode of the third transistor is electrically connected to the writing-in node; a back gate electrode of the third transistor is electrically connected to the second voltage terminal.

Optionally, the second control circuit includes a fourth transistor; the driving circuit includes a driving transistor;

A control electrode of the fourth transistor is electrically connected to the second control terminal, a first electrode of the fourth transistor is electrically connected to the power supply voltage terminal, and a second electrode of the fourth transistor is electrically connected to the first terminal of the driving circuit; a back gate electrode of the fourth transistor is electrically connected to the second voltage terminal;

A control electrode of the driving transistor is the control terminal of the driving circuit, a first electrode of the driving transistor is the first terminal of the driving circuit, and a second electrode of the driving transistor is electrically connected to the second terminal of the driving circuit; a back gate electrode of the driving transistor is electrically connected to the second voltage terminal.

Optionally, the third control circuit includes a fifth transistor;

A control electrode of the fifth transistor is electrically connected to the third control terminal, a first electrode of the fifth transistor is electrically connected to the third voltage terminal, and a second electrode of the fifth transistor is electrically connected to the first electrode of the light emitting element; a back gate electrode of the fifth transistor is electrically connected to the fourth voltage terminal.

In at least one embodiment of the present disclosure, the driving transistor, the first transistor, the second transistor and the fourth transistor may all be P-type metal-oxide-semiconductor (PMOS) transistors, and the fifth transistor may be N-type metal-oxide-semiconductor (NMOS) transistor, but not limited thereto. In specific implementation, the driving transistor, the first transistor, the second transistor, the fourth transistor and the fifth transistor may all be PMOS transistors.

In at least one embodiment of the present disclosure, the back gate electrode of each PMOS transistor is electrically connected to the second voltage terminal, but not electrically connected to the power supply voltage terminal, so that the substrate n-hydrazine potential of each PMOS transistor is separated from the power supply voltage, which is facilitate to the bias effect of the base substrate.

Optionally, the second voltage terminal may be a high voltage terminal, but not limited thereto.

Figure 8:
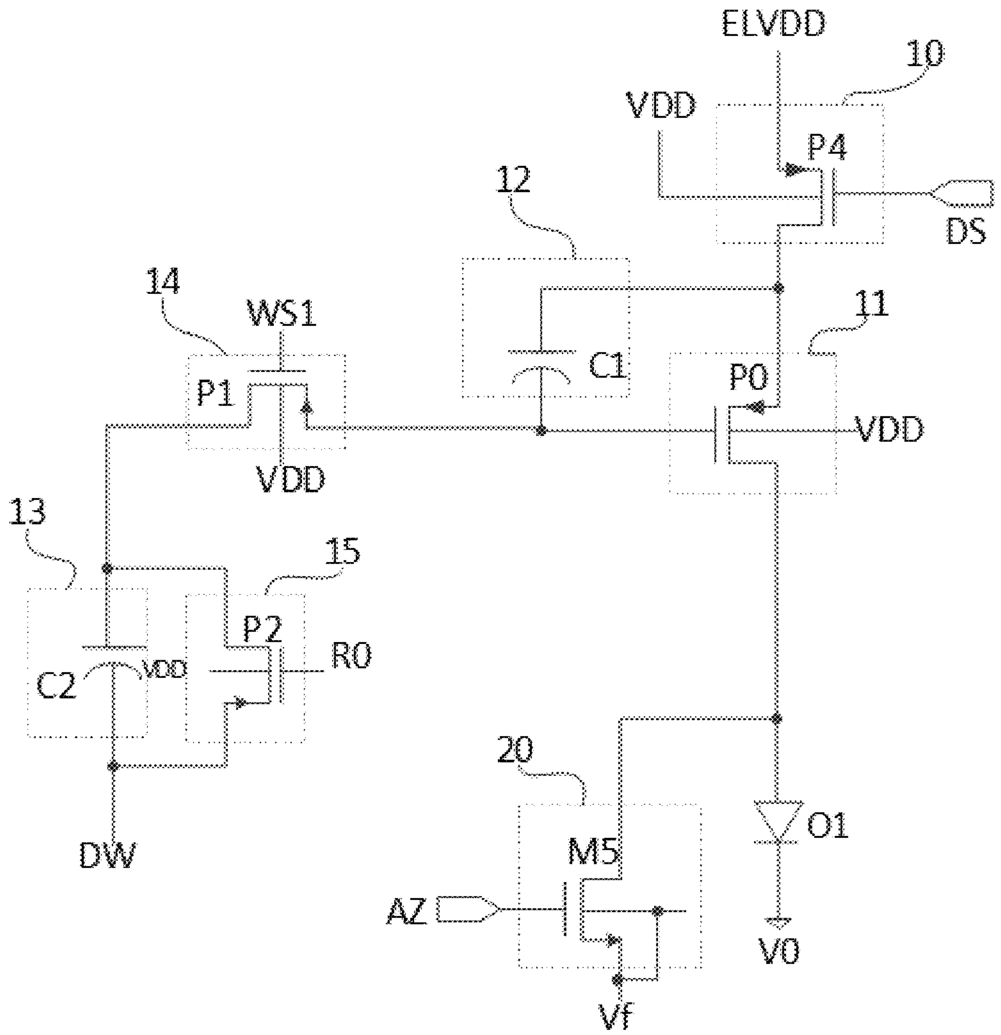
FIG. 8 is a circuit diagram of a pixel circuit according to at least one embodiment of the present disclosure.

As shown in FIG. 8, on the basis of at least one embodiment of the pixel circuit shown in FIG. 4, the light emitting element is an organic light emitting diode O1;

The first energy storage circuit 12 includes a first capacitor C1; the second energy storage circuit 13 includes a second capacitor C2; the writing-in control circuit 14 includes a first transistor P1; the driving circuit 11 includes a driving transistor P0;

The first terminal of the first capacitor C1 is electrically connected to the gate electrode of the driving transistor P0, and the second terminal of the first capacitor C1 is electrically connected to the source electrode of the driving transistor P0;

The gate electrode of the first transistor P1 is electrically connected to the first writing-in control terminal WS1, the source electrode of the first transistor P1 is electrically connected to the gate electrode of the driving transistor P0, and the drain electrode of the first transistor P1 is electrically connected to the first terminal of the second capacitor C2; the back gate electrode of the first transistor P1 is electrically connected to a high voltage terminal; the high voltage terminal is used to provide a high voltage VDD;

The second terminal of the second capacitor C2 is electrically connected to the writing-in terminal DW;

The first control circuit 15 includes a second transistor P2;

The gate electrode of the second transistor P2 is electrically connected to the first control terminal R0, the source electrode of the second transistor P2 is electrically connected to the first terminal of the second capacitor C2, and the drain electrode of the second transistor P2 is electrically connected to the second terminal of the second capacitor C2; the back gate electrode of the second transistor P2 is electrically connected to a high voltage terminal; the high voltage terminal is used to provide a high voltage VDD;

The second control circuit 10 includes a fourth transistor P4;

The gate electrode of the fourth transistor P4 is electrically connected to the second control terminal DS, the source electrode of the fourth transistor P4 is electrically connected to the power supply voltage terminal Vd, and the second electrode of the fourth transistor P4 is electrically connected to the source electrode of the driving transistor P0; the back gate electrode of the fourth transistor P4 is electrically connected to a high voltage terminal; the high voltage terminal is used to provide a high voltage VDD;

The back gate electrode of the driving transistor P0 is electrically connected to the high voltage terminal;

The third control circuit 20 includes a fifth transistor M5;

The gate electrode of the fifth transistor M5 is electrically connected to the third control terminal AZ, the source electrode of the fifth transistor M5 is electrically connected to the third voltage terminal Vf, and the drain electrode of the fifth transistor M5 is electrically connected to the anode of the organic light emitting diode O1; the back gate electrode of the fifth transistor M5 is electrically connected to the third voltage terminal Vf;

The cathode of the OLED O1 is electrically connected to the low voltage terminal V0. In at least one embodiment of the present disclosure, the fifth transistor is an n-type transistor, and the fourth voltage terminal is the third voltage terminal; or, The fifth transistor is a p-type transistor, and the fourth voltage terminal is a second voltage terminal.

In at least one embodiment of the present disclosure, when the fifth transistor is an n-type transistor, a deep n-hydrazine is provided between the back gate electrode of the fifth transistor and the P-type substrate to isolate the back gate electrode of the fifth transistor and the P-type base substrate; the back gate electrode of the fifth transistor and the first electrode of the fifth transistor are both electrically connected to the third voltage terminal.

Optionally, the pixel circuit described in at least one embodiment of the present disclosure may further include n-hydrazine; the doping concentration of the n-hydrazine is greater than the doping concentration of the deep n-hydrazine;

The ratio of the thickness of the n hydrazine to the thickness of the deep n hydrazine is greater than or equal to 0.4 and less than or equal to 0.6; but not limited thereto.

For example, the thickness of the n-hydrazine may be 0.5 um, and the thickness of the deep-n-hydrazine may be 1 um.

In specific implementation, the pixel circuit described in at least one embodiment of the present disclosure may further include p hydrazine; the ratio of the thickness of the p hydrazine to the thickness of the deep n hydrazine is greater than or equal to 0.4 and less than or equal to 0.6; but not limit.

For example, the thickness of the p hydrazine may be 0.5 um, and the thickness of the deep n hydrazine may be 1 um.

In at least one embodiment shown in FIG. 8, the fourth voltage terminal is the third voltage terminal Vf, but not limited thereto.

In at least one embodiment shown in FIG. 8, when the organic light emitting diode O1 emits light at the 0 gray scale, the potential of the anode of the organic light emitting diode O1 may be −5V. At this time, the third voltage signal may be a −5V voltage signal, and the low voltage terminal V0 may provide a −9V voltage signal, but not limited thereto.

In at least one embodiment of the pixel circuit shown in FIG. 8, P0, P1, P2 and P4 are all PMOS transistors, and M5 is an NMOS transistor.

In at least one embodiment of the pixel circuit shown in FIG. 8, the second transistor P2 and the second capacitor C2 may be located outside the valid display area, and each column of pixel circuits may share one second transistor and one second capacitor, which is facilitates the realization of a narrow frame; and, in the valid display area, one pixel circuit only includes one capacitor, which can effectively reduce the technology requirements of the circuit.

Figure 9:
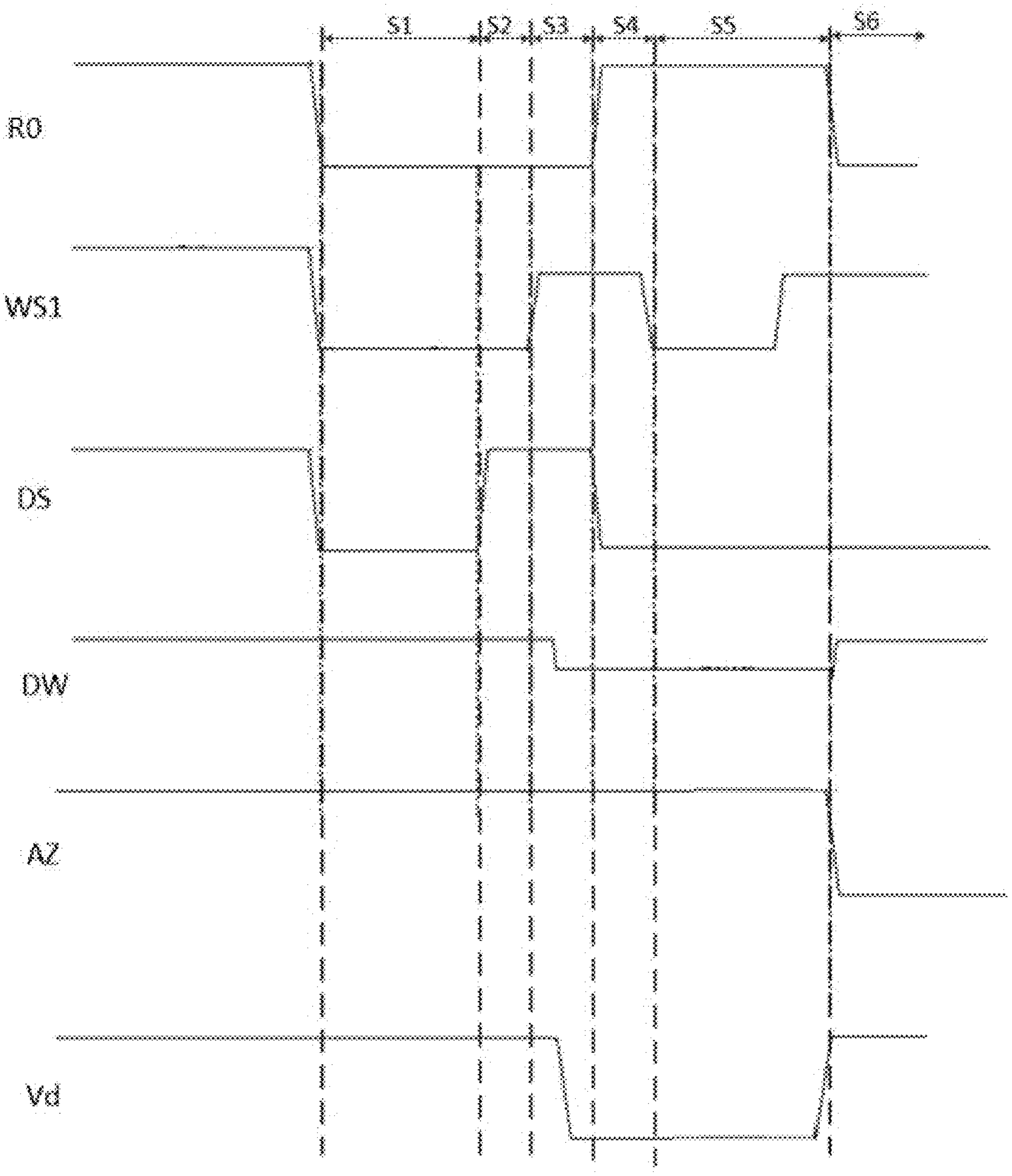
FIG. 9 is a working timing diagram of the pixel circuit shown in FIG. 8 of at least one embodiment of the present disclosure.
Figure 10A:
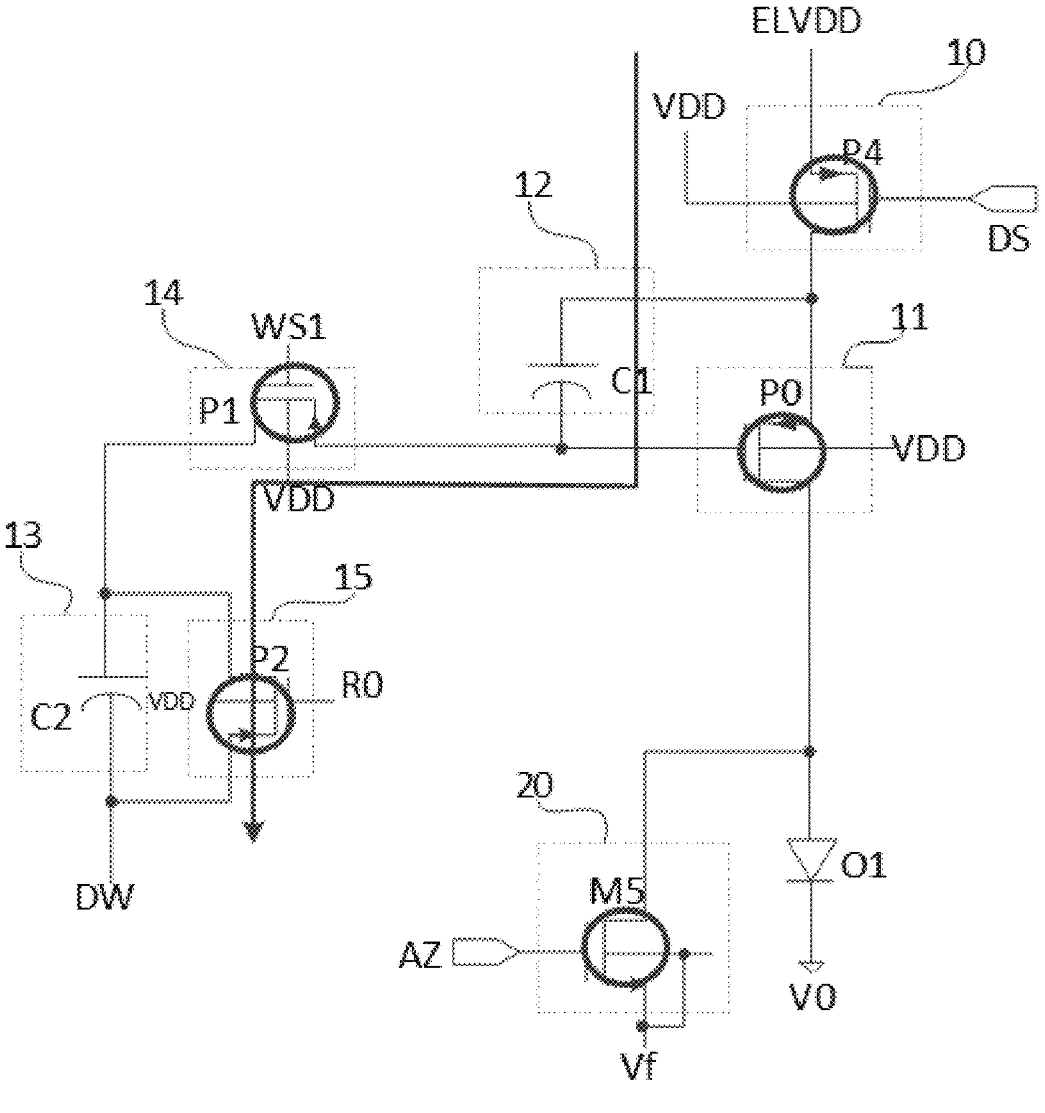
FIG. 10A is a schematic diagram of the working state of the pixel circuit shown in FIG. 8 in the initialization phase S1 of at least one embodiment of the present disclosure.
Figure 10B:
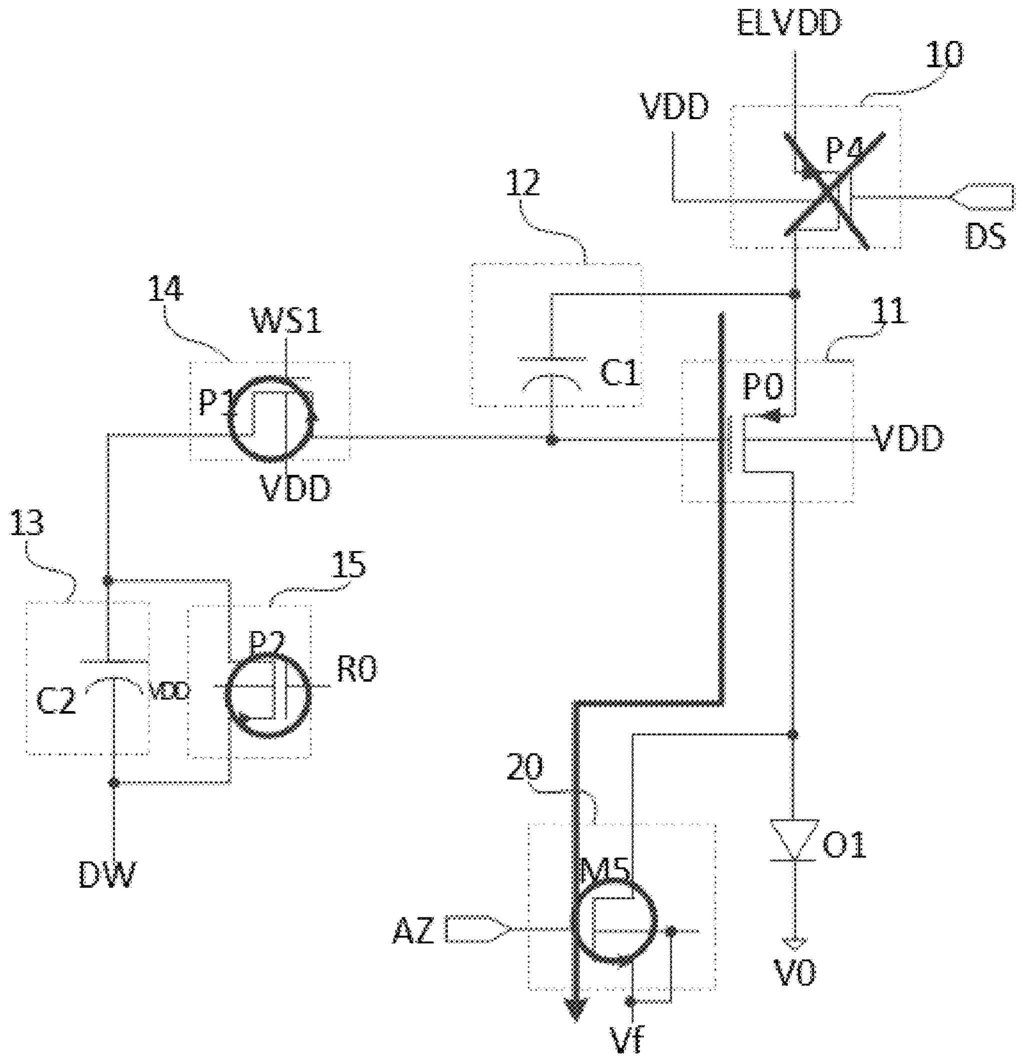
FIG. 10B is a schematic diagram of the working state of the pixel circuit shown in FIG. 8 in the self-discharge phase S2 of at least one embodiment of the present disclosure.

As shown in FIG. 9, when at least one embodiment of the pixel circuit shown in FIG. 8 of the present disclosure is working, the display period may include an initialization phase S1, a self-discharge phase S2, a data preparation phase S3, a potential control phase S4, a data writing-in phase S5 and a light emitting phase S6;

In the initialization phase S1, as shown in FIG. 10A, R0 provides a low voltage signal, WS1 provides a low voltage signal, DS provides a low voltage signal, AZ provides a high voltage signal, P1, P2, P4 and M5 are all turned on, and writing-in terminal DW provides the initial voltage Vofs to the second terminal of C2, and because P2 and P1 are turned on, the potential of the first terminal of C2 is also Vofs, and the gate voltage Vg of P0 is Vofs; at this time, the power supply voltage terminal Vd provides the first power supply voltage ELVDD1; the source voltage Vs of P0 is ELVDD1, then the gate-source voltage Vgs of P0 (Vgs is equal to Vg−Vs) at this time is ELVDD1−Vofs; ELVDD1−Vofs>|Vth|, which is ready for the discharge in the next step; wherein, Vth is the threshold voltage of the driving transistor P0 without the back gate effect;

In the self-discharge phase S2, R0 provides a low voltage signal, WS1 provides a low voltage signal, DS provides a high voltage signal, AZ provides a high voltage signal, and the power supply voltage terminal Vd provides the first power supply voltage ELVDD1; as shown in FIG. 10B, P1 And P2 is turned on, P4 is turned off, and discharge starts, the source voltage Vs of P0 drops, and as Vs drops, a back gate effect occurs, |Vth_ef| is equal to a×(VDD−Vs)+|Vth|, wherein Vth_ef is the threshold voltage of P0 with back gate effect, a is the coefficient of back gate effect; as Vs decreases, Vgs decreases synchronously, when |Vth_ef| increases to |Vgs|, P0 is turned off and stops discharging; at this time, $$a\times(VDD-Vs)+|Vth|=|Vgs|;\ Vs=\frac{V_{ofs}-a\times VDD-|Vth|}{1-a};$$

$$Vg=Vofs;\ |V_{gs}|=\frac{-a\times V_{ofs}+a\times VDD+|Vth|}{1-a};$$

Figure 10C:
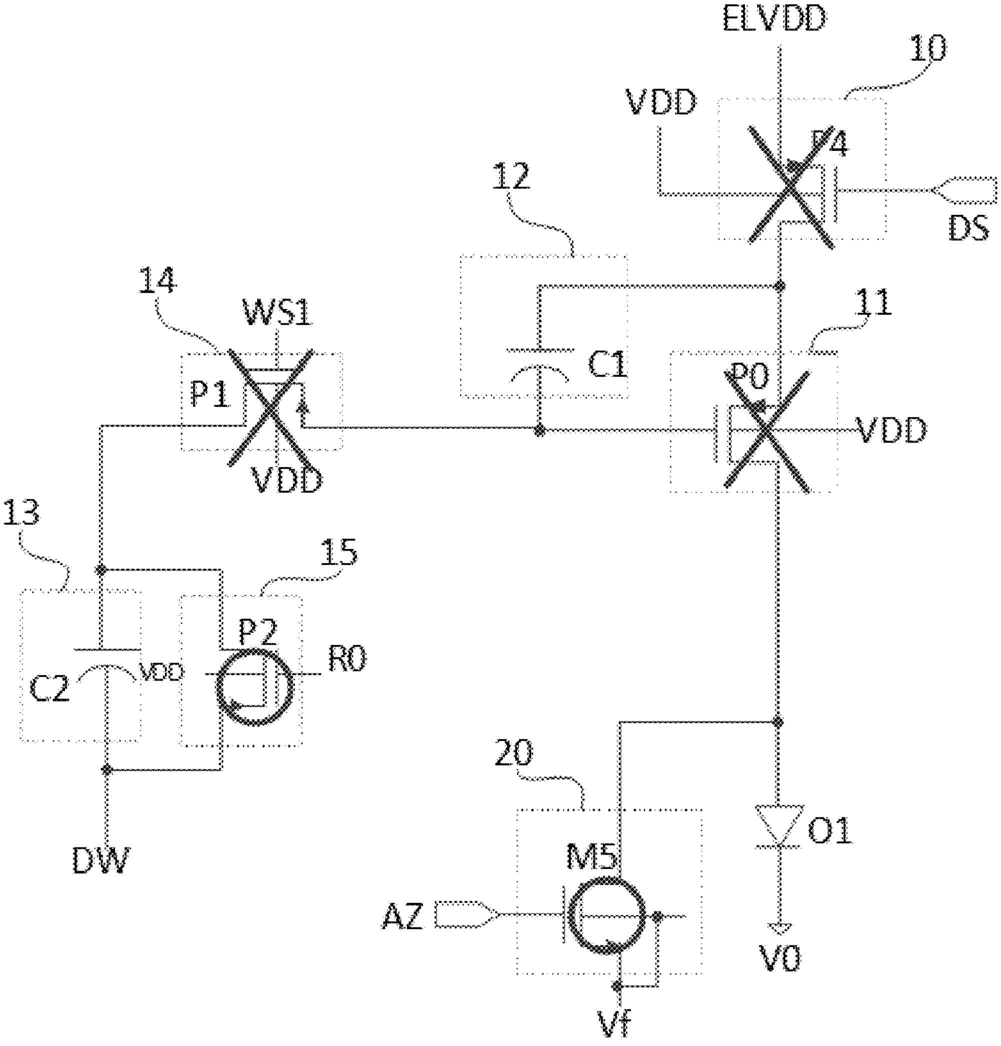
FIG. 10C is a schematic diagram of the working state of the pixel circuit shown in FIG. 8 in the data preparation phase S3 of at least one embodiment of the present disclosure.
Figure 10D:
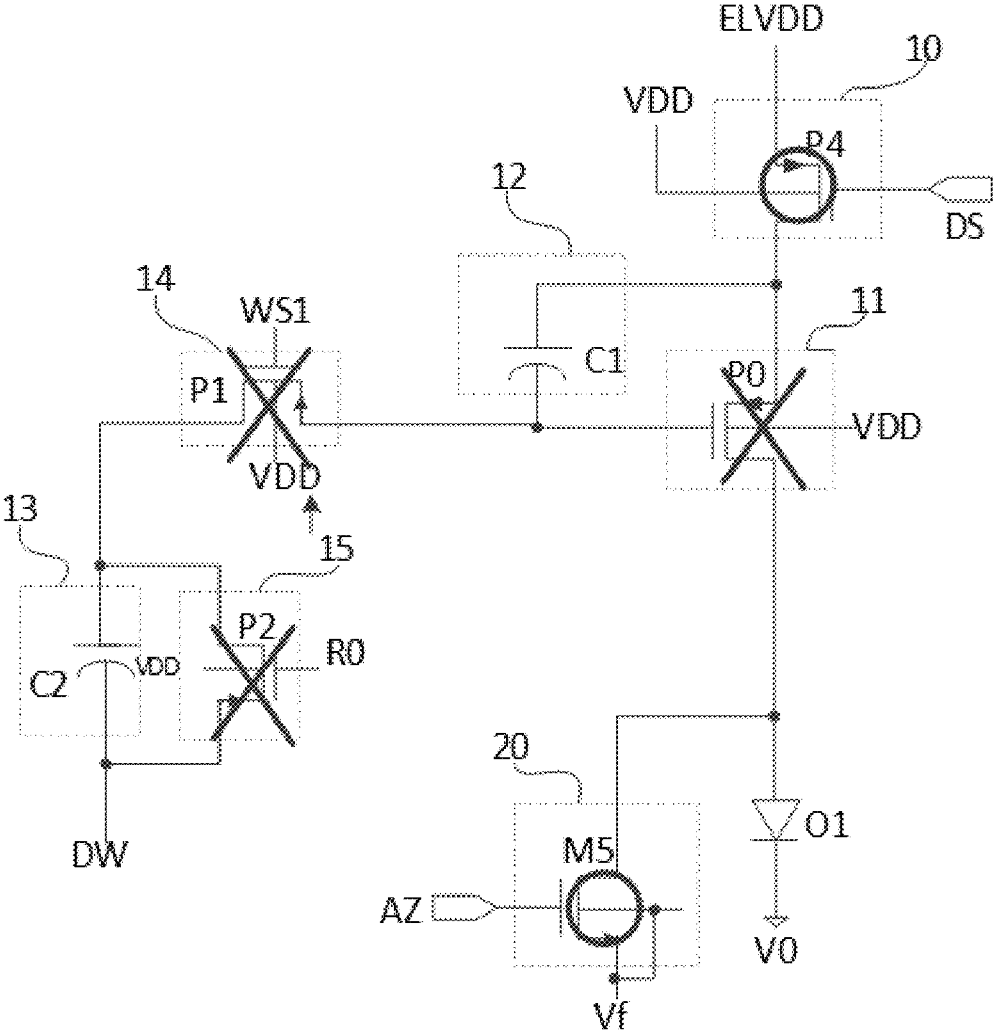
FIG. 10D is a schematic diagram of the working state of the pixel circuit shown in FIG. 8 in the potential control phase S4 of at least one embodiment of the present disclosure.
Figure 10E:
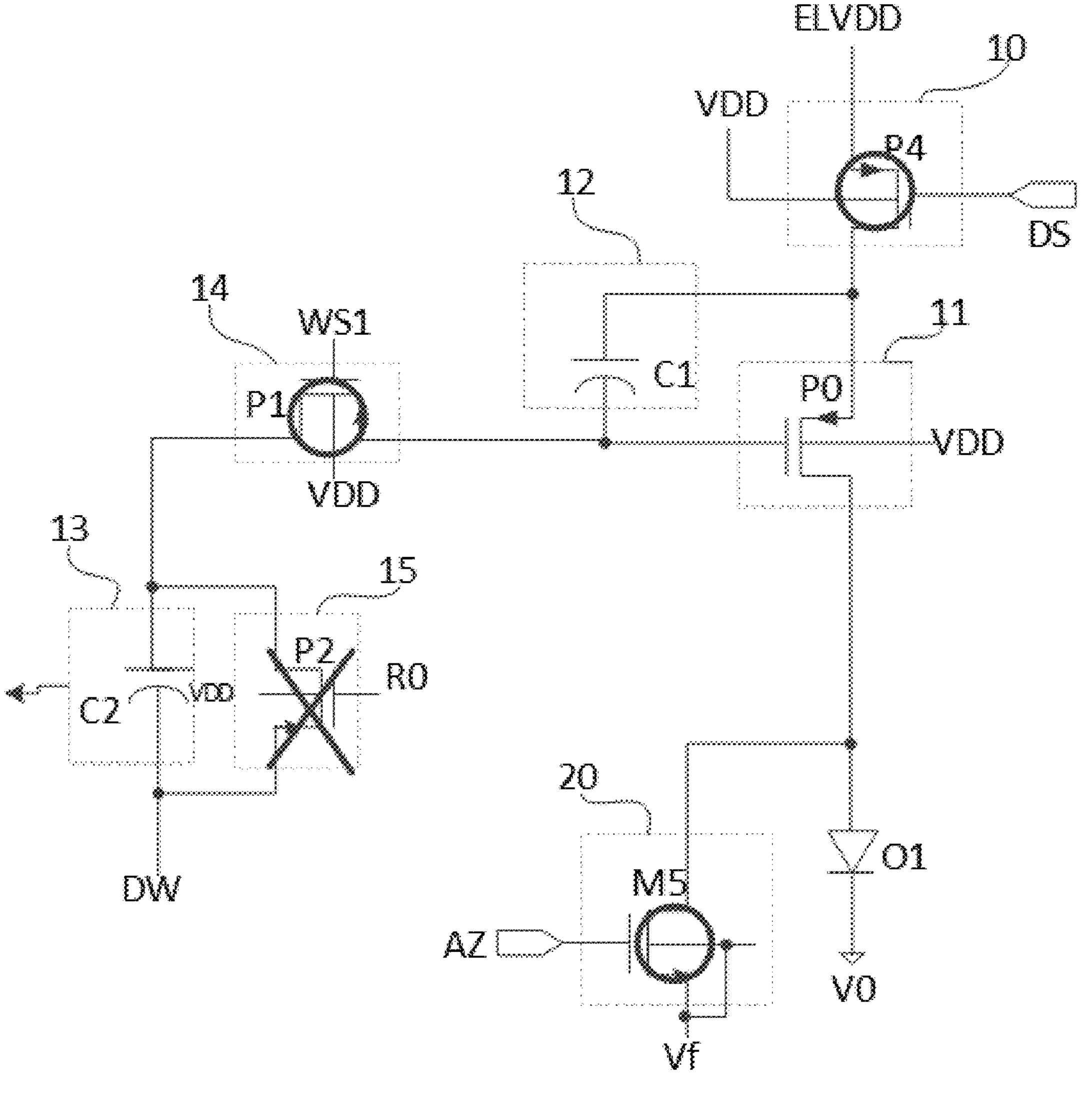
FIG. 10E is a schematic diagram of the working state of the pixel circuit shown in FIG. 8 in the data writing-in-in phase S5 of at least one embodiment of the present disclosure.

In the self-discharge phase S2, as shown in FIG. 10B, M5 is turned on; and when the self-discharge phase S2 starts, P0 is turned on;

In the data preparation phase S3, R0 provides a low voltage signal, and WS1 provides a high voltage signal. As shown in FIG. 10C, P1 is turned off first, and the signal provided by the writing-in terminal DW changes from the initial voltage Vofs to the data voltage Vdata. At the same time, the power supply voltage provided by the power supply voltage terminal Vd is reduced from the first power supply voltage ELVDD1 to the second power supply voltage ELVDD2 (for example, ELVDD1 can be 3V, and ELVDD2 can be, for example, 1.5V, but not limited thereto); DS provides a high voltage signal, AZ Provide a high voltage signal, as shown in FIG. 10C, P4 is turned off, P1 is turned off, P0 is turned off, C1 keeps the absolute value |Vgs| of the gate-source voltage of P0 to be the same as in previous phase, that is, $$|V_{gs}|=\frac{-a\times V_{ofs}+a\times VDD+|Vth|}{1-a};$$

at this time, M5 is turned on, P2 is turned on, the voltage at both terminals of C2 is Vdata, and C2 does not store charge;

In the potential control phase S4, as shown in FIG. 10D, R0 provides a high voltage signal, WS1 provides a high voltage signal, DS provides a low voltage signal, AZ provides a high voltage signal, M5 is turned on, P4 is turned on, and the potential of the second terminal of C1 is pulled up to ELVDD2, P2 is turned off, P1 is turned off, and P0 is turned off; at this time, C1 maintains |Vgs| as the value in the previous phase, $$|V_{gs}|=\frac{-a\times V_{ofs}+a\times VDD+|Vth|}{1-a};$$

at this time, the potential at both terminals of C2 is Vdata, and C2 does not store charge;

In the data writing-in phase S5, R0 provides a high voltage signal, WS1 provides a low voltage signal, DS provides a low voltage signal, and AZ provides a high voltage signal. As shown in FIG. 10E, M5 is turned on, P1 is turned on, P2 is turned off, and Charge redistribution is performed on C1 and C2, at this time, $$Vg=\frac{C1z*|Vgs|+C2z*Vdata+1.5C1z}{C1z+C2z};$$

$$Vg=\frac{C1z*(-a*Vofs_{+a*VDD})}{(1-a)(C2z+C1z)}+$$

-continued $$\frac{C1z*|Vth|}{(1-a)(C2z+C1z)}+\frac{C2z*Vdata}{C2z+C1z}+\frac{C1z*ELVDD2}{C2z+C1z};$$

$$|Vgs|=ELVDD2-\frac{C1z*(-a*Vofs_{+a*VDD})}{(1-a)(C2z+C1z)}-$$

$$\frac{C1z*|Vth|}{(1-a)(C2z+C1z)}-\frac{C2z*Vdata}{C2z+C1z}-\frac{C1z*ELVDD2}{C2z+C1z};$$

Figure 10F:
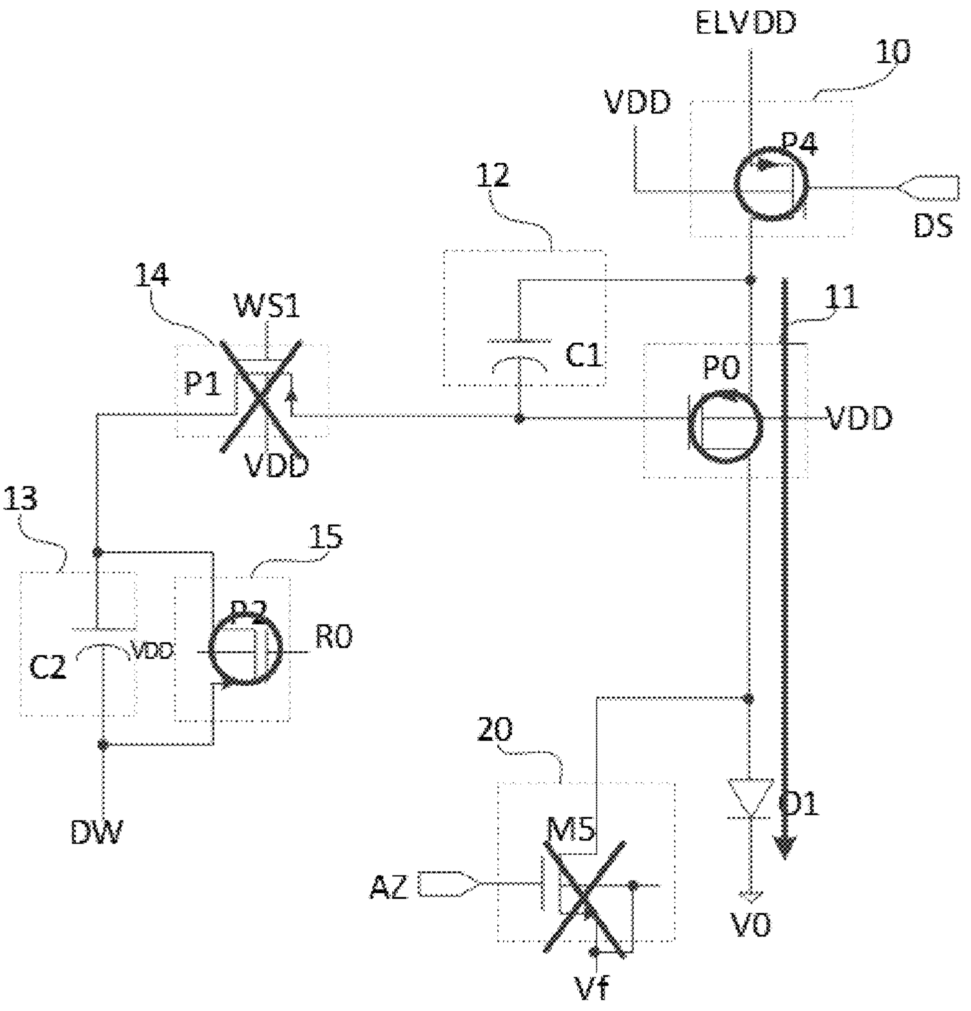
FIG. 10F is a schematic diagram of the working state of the pixel circuit shown in FIG. 8 in the light emitting phase S6 of at least one embodiment of the present disclosure.

Cz1 is the capacitance value of C1, and Cz2 is the capacitance value of C2;

In the light emitting phase S6, DS provides a low voltage signal, WS1 provides a high voltage signal, as shown in FIG. 10F, P4 is turned on, P1 is first turned off, R0 provides a low voltage signal, P2 is turned on again, and the potential of the second terminal of C1 is pulled up to ELVDD2; AZ provides high and low voltage signals, M5 is turned off, at the same time as M5 is turned off, the power supply voltage provided by the power supply voltage terminal rises from ELVDD2 to ELVDD1; the driving transistor P0 drives O1 to emit light, and the driving current generated by the driving transistor P0 is Io1;

$$Io1=K\left(ELVDD2-\frac{C1z*(-a*Vofs_{+a*VDD})}{(1-a)(C2z+C1z)}-\frac{C1z*|Vth|}{(1-a)(C2z+C1z)}-\frac{C2z*Vdata}{C2z+C1z}-\frac{C1z*ELVDD2}{C2z+C1z}-|Vth|\right)^2;$$

Among them, K is the current coefficient of P0;

It can be seen from the formula of Io1 that when $$\frac{C1z}{(a-1)(C2z+C1z)}$$

is equal to 1, Io1 is not related to Vth.

In the light emitting phase S6, the power supply voltage may also be raised from ELVDD2 to ELVDD1 first, and then M5 is controlled to be turned off.

In at least one embodiment of the present disclosure, when the range of ELVDD1 is greater than or equal to 2V and less than or equal to 8V, the value range of VDD can also be greater than or equal to 2V and less than or equal to 8V, and the value range of Vf can be greater than or equal to −6V and less than or equal to 0V; but not limited to this.

In at least one embodiment of the present disclosure, ELVDD1−Vofs may be greater than or equal to 1.5V, but not limited thereto.

In FIGS. 10A-10F, the transistors corresponding to the circles are turned on, and the transistors corresponding to the crosses are turned off.

In at least one embodiment of the pixel circuit shown in FIG. 8 of the present disclosure, the driving transistor P0 is equivalent to a current source controlled by the gate voltage, so that the data voltage Vdata directly controls the driving current flowing through O1. Therefore, the pixel circuit shown in FIG. 8 of at least one embodiment of the present disclosure adopts a current-type pixel driving method, and the driving transistor included in the driving circuit in at least one embodiment of the pixel circuit shown in FIG. 8 of the present disclosure is PMOS transistor, when the anode of O1 is short-circuited with the cathode of O1, the point-strip-line defect will occur due to the anode voltage of O1 is negative, when the anode voltage of O1 is negative, the drain voltage of the driving transistor P0 is also a negative voltage, then if the driving transistor is an NMOS transistor, the source voltage of the driving transistor is a negative voltage, and the parasitic diode between the base substrate of the driving transistor and the source electrode of the driving transistor will be turned on in a forward direction, thereby causing a latch effect, resulting in the point-strip-line defect.

In at least one embodiment of the pixel circuit shown in FIG. 8 of the present disclosure, the driving transistor is a PMOS transistor. Compared with the pixel circuit in which the driving transistor is an NMOS transistor, at least one embodiment of the present disclosure can have a wider anode dynamic range due to the following reasons.

For the current type pixel circuit in which the driving transistor is an NMOS transistor, when the voltage of the anode of the organic light emitting diode O1 is set to a negative voltage, the negative voltage will be connected to the drain electrode of the driving transistor, and when the driving transistor is an NMOS transistor, there is a forward-biased diode between the back gate electrode of the driving transistor and the drain electrode of the driving transistor, which causes a latch-up effect and makes the pixel circuit work abnormally. Therefore, the current type pixel circuit in which the driving transistor is a PMOS transistor has a wider anode dynamic range. When the driving transistor in the current type pixel circuit is a PMOS transistor, the potential of the anode of the organic light emitting diode O1 may be a negative voltage.

At least one embodiment of the pixel circuit shown in FIG. 8 of the present disclosure can perform self-discharge threshold voltage compensation before the data voltage is written, which can improve the display uniformity of the pixel circuit.

When at least one embodiment of the pixel circuit shown in FIG. 8 of the present disclosure is working, the data voltage is written and divided by two capacitors, which expands the dynamic range of the data voltage and is beneficial to the design of the DAC in the source driver and uniformity of data line output.

In the related pixel circuit, P0 is an NMOS transistor. The higher the potential of the gate electrode of P0 is, the brighter the organic light emitting diode is. Therefore, in the non-light emitting period, the drain electrode of P1 leaks current to the first capacitor C1, which will raise the potential of gate electrode of P0, so that the brightness of the organic light emitting diode is increased, and bright spots appear. At least one embodiment of the present disclosure sets P0 as a PMOS transistor to solve the above problem.

At least one embodiment of the pixel circuit shown in FIG. 8 of the present disclosure can prevent the N-type substrate of the first transistor P1 used to transmit the data voltage from leaking current to the drain electrode of the first transistor P1 to the first capacitor C1, while low-grayscale bright spot phenomenon occurs for the following reasons:

In at least one embodiment of the pixel circuit shown in FIG. 8 of the present disclosure, P0 is a PMOS transistor, so in the non-light emitting phase, even if the N-type substrate of the first transistor P1 leaks current to the drain electrode of the first transistor P1 to the first capacitor C1, and the potential of the gate electrode of P0 is increased. Since the driving transistor P0 is also a PMOS transistor, the brightness of the organic light emitting diode O1 will not increase, and no bright spots will appear.

At least one embodiment of the pixel circuit shown in FIG. 8 of the present disclosure is a current-type pixel circuit, which can compensate for the lifetime attenuation caused by the increase of the internal resistance of the organic light emitting diode O1, and, in the pixel circuit shown in FIG. 8, the back gate electrode of each PMOS transistor is connected to the high voltage VDD, but not electrically connected to the power supply voltage terminal, so that the potential of n well of base substrate of each PMOS transistor is separated from the power supply voltage terminal, which is beneficial to bias effect of the base substrate, the potential of the base substrate of the PMOS transistor is higher than the potential of the source electrode of the PMOS transistor, and the back gate effect makes the PMOS transistor to be turned off more completely, which can improve the leakage current Ioff of the switching transistor.

In at least one embodiment of the pixel circuit shown in FIG. 8 of the present disclosure, the fifth transistor M5 is an NMOS transistor, and both the back gate electrode of the fifth transistor M5 and the source electrode of the fifth transistor M5 are electrically connected to the third voltage terminal Vf;

A deep n hydrazine is provided between the back gate electrode of the fifth transistor M5 and the P-type base substrate to isolate the back gate electrode of the fifth transistor M5 from the P-type base substrate; the back gate electrode of the fifth transistor M5 and the source electrode of the fifth transistor M5 are electrically connected to the third voltage terminal Vf.

In the related art, in the display panel, the back gate electrode of the N-type transistor in the pixel circuit and the back gate electrode of the N-type transistor in the driving circuit (the driving circuit is used to provide the driving signal for the pixel circuit) are both connected to the p type base substrate. However, in at least one embodiment of the present disclosure, the back gate electrode of the fifth transistor M5 in the pixel circuit needs to be electrically connected to the third voltage terminal Vf, and the P-type base substrate is connected to a voltage of 0V. Therefore, deep n-hydrazine needs to be set between the P-type base substrate and the back gate electrode of the fifth transistor M5 to isolate the P-type base substrate and the back gate electrode of the fifth transistor M5.

In at least one embodiment of the present disclosure, the dynamic range of the anode of the organic light emitting diode O1 needs to be expanded to negative voltage, the withstand voltage of each transistor is 8V, and ELVDD1 is 3V, the lowest anode reset voltage can be −5V, Therefore, the back gate electrode of the fifth transistor M5 needs to be connected to a −5V voltage signal (generally, the source electrode of the NMOS transistor and the back gate electrode of the NMOS transistor are electrically connected to the same voltage terminal), so it is necessary to isolate the P-type base substrate and the back gate electrode of the fifth transistor M5.

Figure 11:
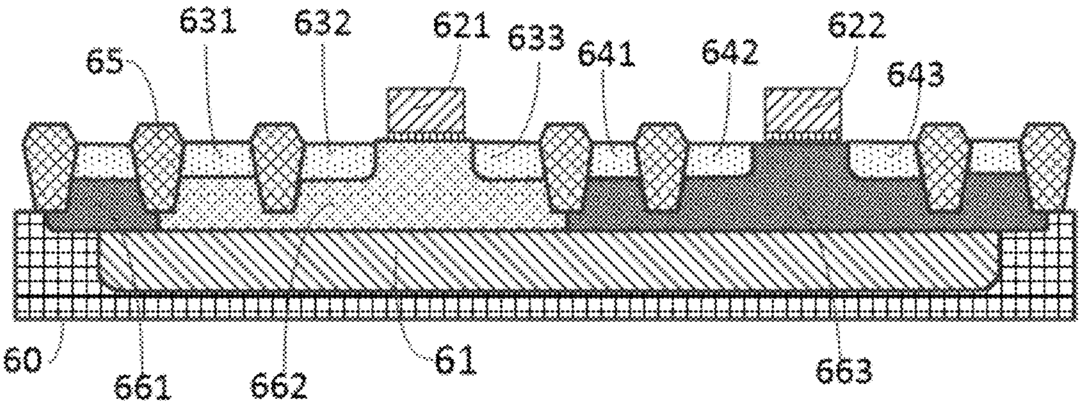
FIG. 11 is a schematic diagram of a structure of an NMOS transistor and a structure of a PMOS according to at least one embodiment of the present disclosure.

FIG. 11 is a structural diagram of an NMOS transistor and a PMOS transistor in at least one embodiment of the present disclosure.

In FIG. 11, the one labeled 60 is a P-type substrate, the one labeled 61 is a deep n hydrazine, the one labeled 621 is a gate electrode of an NMOS transistor, the one labeled 622 is a gate electrode of a PMOS transistor; the one labeled 631 is the back gate electrode of the NMOS transistor, the one labeled 632 is the source electrode of the NMOS transistor, the one labeled 633 is the drain electrode of the NMOS transistor, the one labeled 641 is the back gate electrode of the PMOS transistor, and the one labeled 642 is the source electrode of the PMOS transistor, the one labeled 643 is the drain electrode of the PMOS transistor; the one labeled 65 is an insulating structure; the ones labeled 661 and 663 are N hydrazine, and the one labeled 662 is P hydrazine.

In FIG. 11, the NMOS transistor may be the fifth transistor.

As shown in FIG. 11, a deep n-hydrazine 61 is provided between the back gate electrode 631 of the NMOS transistor and the P-type base substrate 60, so that the back gate electrode of the NMOS transistor can be connected to a −5V voltage signal, and the P-type substrate 60 can be connected to 0V voltage signal.

In the related art, if no deep n-hydrazine is provided between the back gate electrode 631 of the NMOS transistor and the P-type base substrate 60, then the back gate electrode 631 of the NMOS transistor and the P-type base substrate 60 cannot receive different voltage signals.

Figure 12:
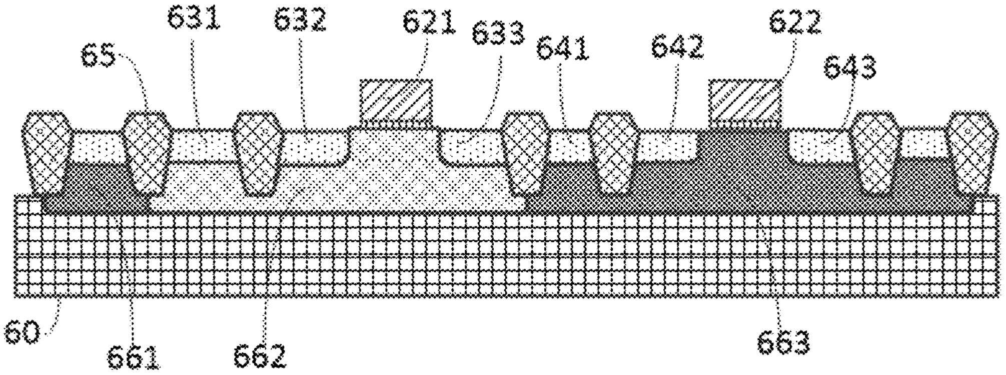
FIG. 12 is a schematic diagram of a structure of an NMOS transistor and a structure of a PMOS in the related art.

FIG. 12 is a schematic structural diagram of an NMOS transistor and a PMOS transistor in the related art.

The difference between FIG. 12 and FIG. 11 is that no deep n hydrazine 61 is provided.

Figure 13:
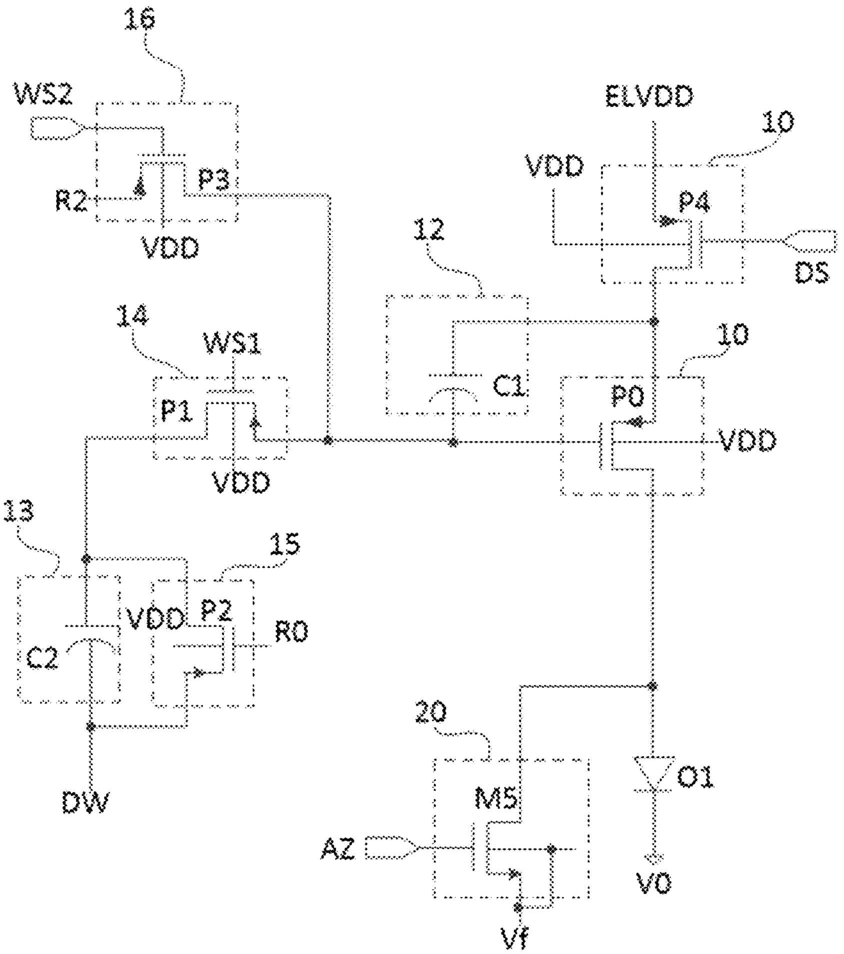
FIG. 13 is a circuit diagram of a pixel circuit according to at least one embodiment of the present disclosure.

As shown in FIG. 13, on the basis of at least one embodiment of the pixel circuit shown in FIG. 8, the pixel circuit described in at least one embodiment of the present disclosure further includes a reference voltage writing-in circuit 16;

The reference voltage writing-in circuit 16 includes a third transistor P3;

The gate electrode of the third transistor P3 is electrically connected to the second writing-in control terminal WS2, the source electrode of the third transistor P3 is electrically connected to the reference voltage terminal R2, and the drain electrode of the third transistor P3 is electrically connected to the gate electrode of the driving transistor P0; the back gate electrode of the third transistor P3 is electrically connected to the high voltage terminal; the reference voltage terminal R2 is used to provide a reference voltage Vref; the high voltage terminal is used to provide a high voltage VDD.

In at least one embodiment of the pixel circuit shown in FIG. 13, P3 is a PMOS transistor, but not limited thereto.

Figure 14:
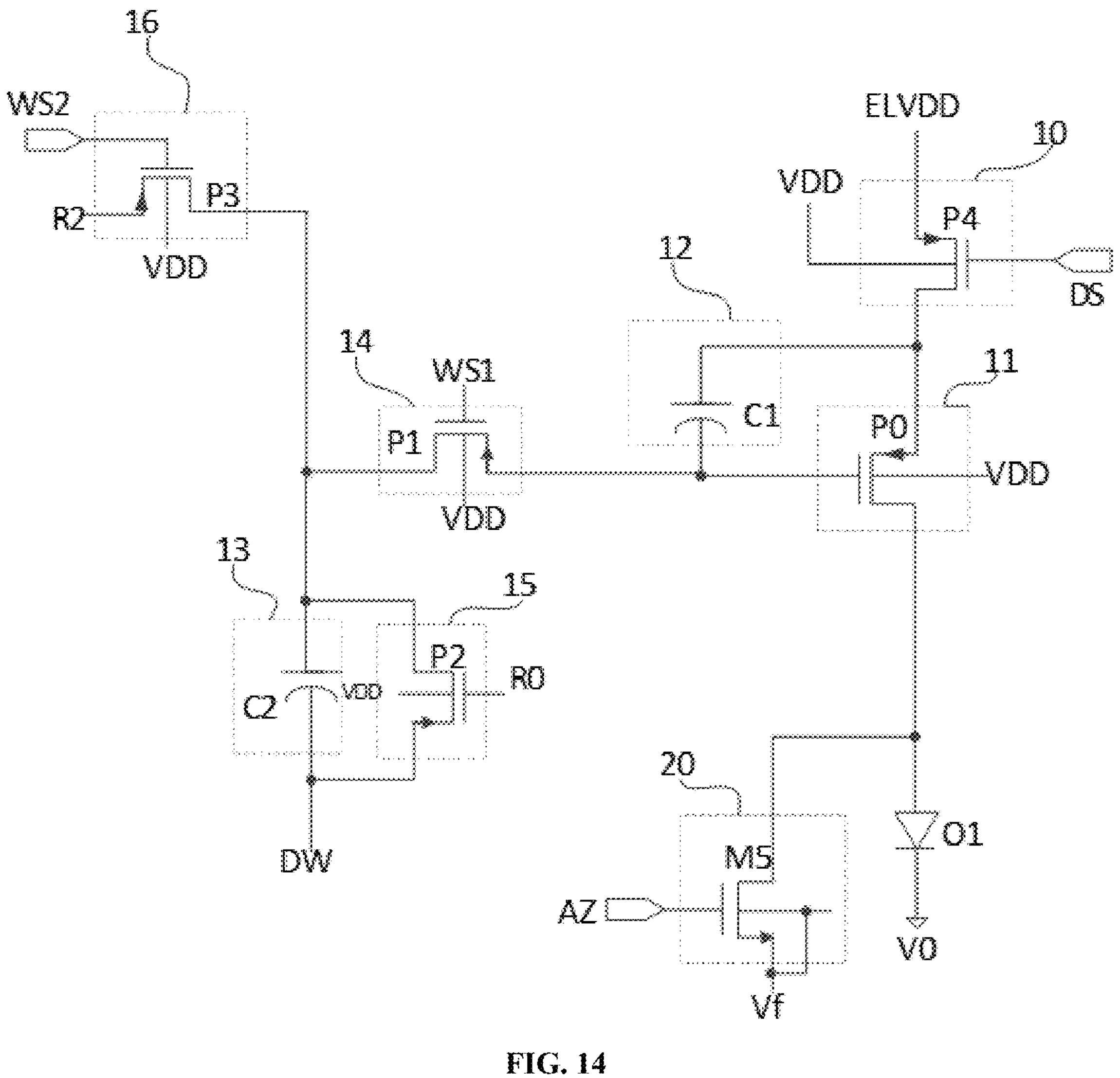
FIG. 14 is a circuit diagram of a pixel circuit according to at least one embodiment of the present disclosure.

As shown in FIG. 14, on the basis of at least one embodiment of the pixel circuit shown in FIG. 8, the pixel circuit described in at least one embodiment of the present disclosure further includes a reference voltage writing-in circuit 16;

The reference voltage writing-in circuit 16 includes a third transistor P3;

The gate electrode of the third transistor P3 is electrically connected to the second writing-in control terminal WS2, the source electrode of the third transistor P3 is electrically connected to the reference voltage terminal R2, and the drain electrode of the third transistor P3 is electrically connected to the first terminal of the second capacitor C2; the back gate electrode of the third transistor P3 is electrically connected to the high voltage terminal; the reference voltage terminal R2 is used to provide a reference voltage Vref; the high voltage terminal is used to provide a high voltage VDD.

In at least one embodiment of the pixel circuit shown in FIG. 14, P3 is a PMOS transistor, but not limited thereto.

Figure 15:
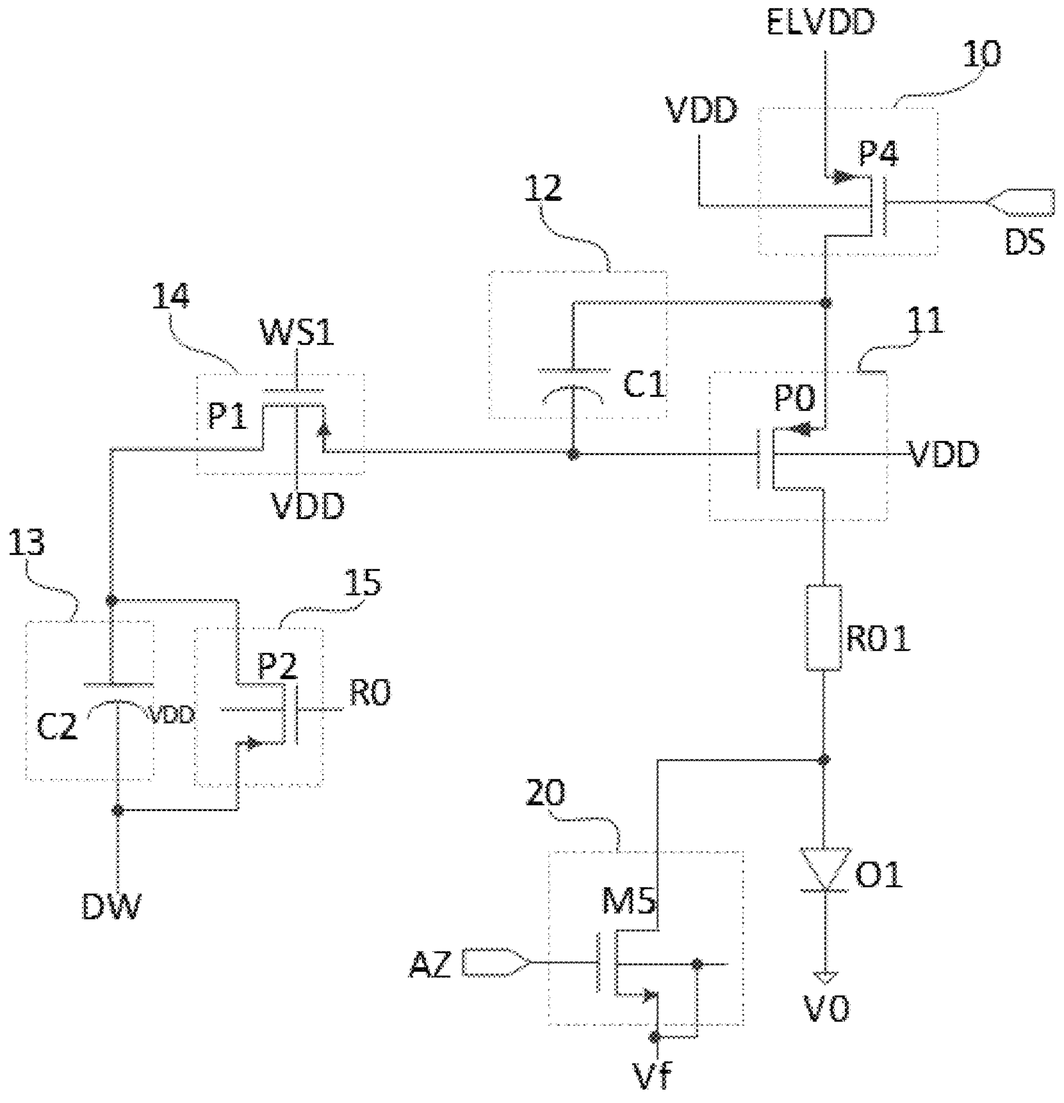
FIG. 15 is a circuit diagram of a pixel circuit according to at least one embodiment of the present disclosure.

As shown in FIG. 15, based on at least one embodiment of the pixel circuit shown in FIG. 8, the pixel circuit described in at least one embodiment of the present disclosure further includes a first resistor R01;

The first resistor R01 is connected between the drain electrode of the driving transistor P0 and the anode of the organic light emitting diode O1;

The first terminal of the first resistor R01 is electrically connected to the drain electrode of the driving transistor P0, and the second terminal of the first resistor R01 is electrically connected to the anode of the organic light emitting diode O1;

The first resistor R01 can prevent a short circuit between the anode of the OLED O1 and the cathode of the OLED O1.

The pixel circuit described in at least one embodiment of the present disclosure includes a light emitting element, a driving circuit, a first energy storage circuit, a second energy storage circuit, and a first control circuit;

The first terminal of the first energy storage circuit is electrically connected to the control terminal of the driving circuit, and the second terminal of the first energy storage circuit is electrically connected to the first terminal of the driving circuit; the first terminal of the second energy storage circuit is electrically connected to the control terminal of the driving circuit, and the second terminal of the second energy storage circuit is electrically connected to the writing-in terminal; the first energy storage circuit and the second energy storage circuit are used for storing electrical energy;

The first control circuit and the second energy storage circuit are connected in parallel, and the first control circuit is used to control to connect or disconnect the first terminal of the second energy storage circuit the and the second terminal of the second energy storage circuit under the control of the first control signal provided by the first control terminal.

The second terminal of the driving circuit is electrically connected to the light emitting element, and the driving circuit is used to generate a driving current for driving the light emitting element under the control of the potential of the control terminal of the driving circuit.

When the pixel circuit described in at least one embodiment of the present disclosure is working, the first control circuit controls to connect or disconnect the first terminal of the second energy storage circuit and the second terminal of the second energy storage circuit under the control of the first control signal; the data voltage is written and divided by the first energy storage circuit and the second energy storage circuit, which expands the dynamic range of the data voltage, which is beneficial to the design of the DAC in the source driver and uniformity of data line output.

In at least one embodiment of the present disclosure, the control terminal of the first control circuit is electrically connected to the first control terminal, and the first terminal of the first control circuit is connected to the first terminal of the second energy storage circuit, the second terminal of the first control circuit is electrically connected to the second terminal of the second energy storage circuit.

Figure 16:
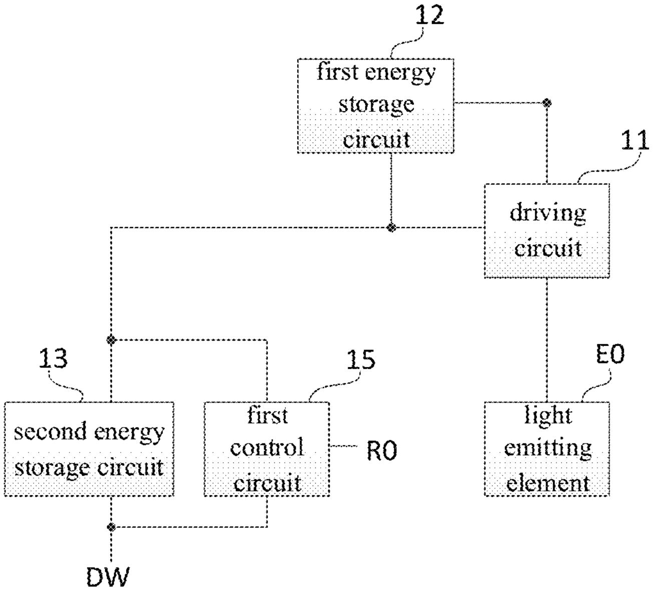
FIG. 16 is a structural diagram of a pixel circuit according to at least one embodiment of the present disclosure.

As shown in FIG. 16, the pixel circuit described in at least one embodiment of the present disclosure may include a light emitting element E0, a driving circuit 11, a first energy storage circuit 12, a second energy storage circuit 13, and a first control circuit 15;

The first terminal of the first energy storage circuit 12 is electrically connected to the control terminal of the driving circuit 11, and the second terminal of the first energy storage circuit 12 is electrically connected to the first terminal of the driving circuit 11; the first terminal of the second energy storage circuit 13 is electrically connected to the control terminal of the driving circuit 11, and the second terminal of the second energy storage circuit 13 is electrically connected to the writing-in terminal DW; the first energy storage circuit 12 and the second energy storage circuit 13 are used to store electric energy;

The first control circuit 15 is electrically connected to the first control terminal R0, the first terminal of the second energy storage circuit 13, and the second terminal of the second energy storage circuit 13, is configured to control to connect or disconnect the first terminal of the second energy storage circuit 13 and the second terminal of the second energy storage circuit 13 under the control of the first control signal provided by the first control terminal R0;

The second terminal of the driving circuit 11 is electrically connected to the light emitting element E0, and the driving circuit 11 is used to generate a driving current to drive the light emitting element E0 under the control of the potential of the control terminal of the driving circuit.

When at least one embodiment of the pixel circuit shown in FIG. 16 of the present disclosure is working, the first control circuit 15 controls to connect or disconnect the first terminal of the second energy storage circuit 13 and the second terminal of the second energy storage circuit 13 under the control of the first control signal; the data voltage is written and divided by the first energy storage circuit 12 and the second energy storage circuit 13, which expands the dynamic range of the data voltage, which is beneficial to the design of the DAC in the source driver and the uniformity of the data line output.

When at least one embodiment of the pixel circuit shown in FIG. 16 of the present disclosure is in operation, the display period may include an initialization phase, a self-discharge phase, a data preparation phase, a potential control phase, a data writing-in phase, and a light emitting phase;

In the initialization phase, the first control circuit 15 controls to connect the first terminal of the second energy storage circuit 13 and the second terminal of the second energy storage circuit 13 under the control of the first control signal, to reset the second energy storage circuit 13;

In the self-discharge phase and the data preparation phase, the first control circuit 15 controls to connect the first terminal of the second energy storage circuit 13 and the second terminal of the second energy storage circuit 13 under the control of the first control signal, to remove the charge stored in the second energy storage circuit 13, so that in data preparation phase, the first energy storage circuit 12 maintains the gate-source voltage of the driving transistor included in the driving circuit 11 to be the same as in the self-discharge phase;

In the potential control phase, the first control circuit 15 controls to disconnect the first terminal of the second energy storage circuit 13 from the second terminal of the second energy storage circuit 13 under the control of the first control signal;

In the data writing-in phase, the first control circuit 15 controls to disconnect the first terminal of the second energy storage circuit 13 from the second terminal of the second energy storage circuit 13 under the control of the first control signal, the writing-in control circuit 14 controls to connect the first terminal of the first energy storage circuit 12 and the first terminal of the second energy storage circuit 13 under the control of the first writing-in control signal. The first energy storage circuit 12 and the second energy storage circuit 13 redistribute charges to change the gate-source voltage of the driving transistor;

In the light emitting phase, the first control circuit 15 controls to connect the first terminal of the second energy storage circuit 13 and the second terminal of the second energy storage circuit 13 under the control of the first control signal, the writing-in control circuit 14 controls to disconnect the first terminal of the first energy storage circuit 12 from the first terminal of the second energy storage circuit 13 under the control of the first writing-in control signal, the driving transistor drives the light emitting element to emit light.

In at least one embodiment of the present disclosure, the pixel circuit may further include a writing-in control circuit; the writing-in control circuit is arranged between the first energy storage circuit and the second energy storage circuit;

A control terminal of the writing-in control circuit is electrically connected to the first writing-in control terminal, a first terminal of the writing-in control circuit is electrically connected to the first terminal of the first energy storage circuit, and a second terminal of the writing-in control circuit is electrically connected to the first terminal of the second energy storage circuit, and the writing-in control circuit is used to control to connect or disconnect the first terminal of the first energy storage circuit and the first terminal of the second energy storage circuit under the control of the first writing-in control signal provided by the first writing-in control terminal.

When the pixel circuit described in at least one embodiment of the present disclosure is in operation, in the initialization phase, the self-discharge phase, and the data writing-in phase, the writing-in control circuit controls to connect the first terminal of the first energy storage circuit and the first terminal of the second energy storage circuit under the control of the first writing-in control signal;

In the data preparation phase, the potential control phase and the light emitting phase, the writing-in control circuit controls to disconnect the first terminal of the first energy storage circuit and the first terminal of the second energy storage circuit under the control of the first writing-in control signal.

The pixel circuit described in at least one embodiment of the present disclosure further includes a second control circuit;

The second control circuit is electrically connected to the second control terminal, the power supply voltage terminal and the first terminal of the driving circuit, and is used to control to connect or disconnect the power supply voltage terminal and the first terminal of the driving circuit under the control of the second control signal provided by the second control terminal.

In a specific implementation, the second control circuit can control to connect or disconnect the power supply voltage terminal and the first terminal of the driving circuit under the control of the second control signal, so as to control the self-discharge threshold compensation process of the driving transistor included in the driving circuit.

Optionally, the second terminal of the driving circuit is electrically connected to the first electrode of the light emitting element, and the second electrode of the light emitting element is electrically connected to the first voltage terminal;

The power supply voltage terminal is used to provide a power supply voltage, and the first voltage terminal is used to provide a first voltage signal;

The absolute value of the voltage value of the power supply voltage is smaller than the absolute value of the voltage value of the first voltage signal.

In at least one embodiment of the present disclosure, the voltage value range of the power supply voltage may be greater than or equal to 1V and less than or equal to 3V, and the voltage value range of the first voltage signal may be greater than or equal to −8V and less than or equal to −5V, but is not the limit.

The pixel circuit described in at least one embodiment of the present disclosure may further include a third control circuit; the second terminal of the driving circuit is electrically connected to the first electrode of the light emitting element, and the second electrode of the light emitting element is electrically connected to the first voltage terminal;

The third control circuit is electrically connected to the third control terminal, the third voltage terminal and the first electrode of the light emitting element, and is used to control to write the third voltage signal provided by the third voltage terminal into the first electrode of the light emitting element.

In a specific implementation, the third control circuit is used to write the third voltage signal provided by the third voltage terminal into the first electrode of the light emitting element in the non-light emitting phase under the control of the third control signal, so that the difference between the potential of the first electrode of the light emitting element and the potential of the second electrode of the light emitting element is smaller than the turn-on voltage of the light emitting element, so as to control the light emitting element not to emit light.

When the pixel circuit described in at least one embodiment of the present disclosure is working, the third control circuit can reset the potential of the first electrode of the light emitting element, and can also play a shunt function during the light emitting phase to improve the driving accuracy of tiny current of the high silicon-based OLED.

Optionally, the pixel circuit described in at least one embodiment of the present disclosure may further include a reference voltage writing-in circuit;

The reference voltage writing-in circuit is electrically connected to the second writing-in control terminal, the reference voltage terminal and the writing-in node respectively, and is used to write the reference voltage provided by the reference voltage terminal into the writing-in node under the control of the second writing-in control signal provided by the second writing-in control terminal, so as to control the potential of the writing-in node;

The writing-in node is electrically connected to the control terminal of the driving circuit, or the writing-in node is electrically connected to the first terminal of the second energy storage circuit.

In at least one embodiment of the present disclosure, the pixel circuit may further include a resistor circuit;

A first terminal of the resistor circuit is electrically connected to the second terminal of the driving circuit, and a second terminal of the resistor circuit is electrically connected to the first electrode of the light emitting element, so as to prevent the short circuit between the first electrode of the light emitting element and the second electrode of the light emitting element.

The second electrode of the light emitting element is electrically connected to the first voltage terminal.

Optionally, the first energy storage circuit includes a first capacitor, and the second energy storage circuit includes a second capacitor;

A first terminal of the first capacitor is electrically connected to the control terminal of the driving circuit and the first terminal of the writing-in control circuit, and the second terminal of the first capacitor is connected to the first terminal of the driving circuit; the first terminal of the second capacitor is electrically connected to the second terminal of the writing-in control circuit, and the second terminal of the second capacitor is electrically connected to the writing-in terminal;

The capacitance value of the second capacitor is smaller than the capacitance value of the first capacitor.

In at least one embodiment of the present disclosure, since the first capacitor needs to control the potential of the driving transistor in the driving circuit within one frame time, the capacitance value of the first capacitor needs to be set larger, and the capacitance value of the first capacitor is set to be greater than the capacitance value of the second capacitor.

Optionally, the writing-in control circuit includes a first transistor;

A control electrode of the first transistor is electrically connected to the first writing-in control terminal, a first electrode of the first transistor is electrically connected to the control terminal of the driving circuit, and a second electrode of the first transistor is electrically connected to the first terminal of the second energy storage circuit; a back gate electrode of the first transistor is electrically connected to the second voltage terminal.

Optionally, the first control circuit includes a second transistor;

A control electrode of the second transistor is electrically connected to the first control terminal, a first electrode of the second transistor is electrically connected to the first terminal of the second energy storage circuit, and a second electrode of the second transistor is electrically connected to the second terminal of the second energy storage circuit; a back gate electrode of the second transistor is electrically connected to the second voltage terminal.

Optionally, the reference voltage writing-in circuit includes a third transistor;

A control electrode of the third transistor is electrically connected to the second writing-in control terminal, a first electrode of the third transistor is electrically connected to the reference voltage terminal, and a second electrode of the third transistor is electrically connected to the writing-in node; a back gate electrode of the third transistor is electrically connected to the second voltage terminal.

Optionally, the second control circuit includes a fourth transistor; the driving circuit includes a driving transistor;

A control electrode of the fourth transistor is electrically connected to the second control terminal, a first electrode of the fourth transistor is electrically connected to the power supply voltage terminal, and a second electrode of the fourth transistor is electrically connected to the first terminal of the driving circuit; a back gate electrode of the fourth transistor is electrically connected to the second voltage terminal;

A control terminal of the driving transistor is the control terminal of the driving circuit, a first electrode of the driving transistor is the first terminal of the driving circuit, and a second electrode of the driving transistor is the second terminal of the driving circuit; a back gate electrode of the driving transistor is electrically connected to the second voltage terminal.

Optionally, the third control circuit includes a fifth transistor;

A control electrode of the fifth transistor is electrically connected to the third control terminal, a first electrode of the fifth transistor is electrically connected to the third voltage terminal, and a second electrode of the fifth transistor is electrically connected to the first electrode of the light emitting terminal; a back gate electrode of the fifth transistor is electrically connected with the fourth voltage terminal.

In at least one embodiment of the present disclosure, the fifth transistor may be an n-type transistor; the fourth voltage terminal is a third voltage terminal;

A deep n hydrazine is arranged between the back gate electrode of the fifth transistor and the P-type base substrate to isolate the back gate electrode of the fifth transistor from the P-type base substrate; the back gate electrode of the fifth transistor and the first electrode of the fifth transistor are both electrically connected to the reset voltage terminal.

Optionally, the pixel circuit described in at least one embodiment of the present disclosure may further include n-hydrazine; the doping concentration of the n-hydrazine is greater than the doping concentration of the deep n-hydrazine;

The ratio of the thickness of the n hydrazine to the thickness of the deep n hydrazine is greater than or equal to 0.4 and less than or equal to 0.6; but not limited thereto.

For example, the thickness of the n-hydrazine may be 0.5 um, and the thickness of the deep-n-hydrazine may be 1 um.

In specific implementation, the pixel circuit described in at least one embodiment of the present disclosure may further include p hydrazine; the ratio of the thickness of the p hydrazine to the thickness of the deep n hydrazine is greater than or equal to 0.4 and less than or equal to 0.6; but not limit.

For example, the thickness of the p hydrazine may be 0.5 um, and the thickness of the deep n hydrazine may be 1 um.

Figure 17:
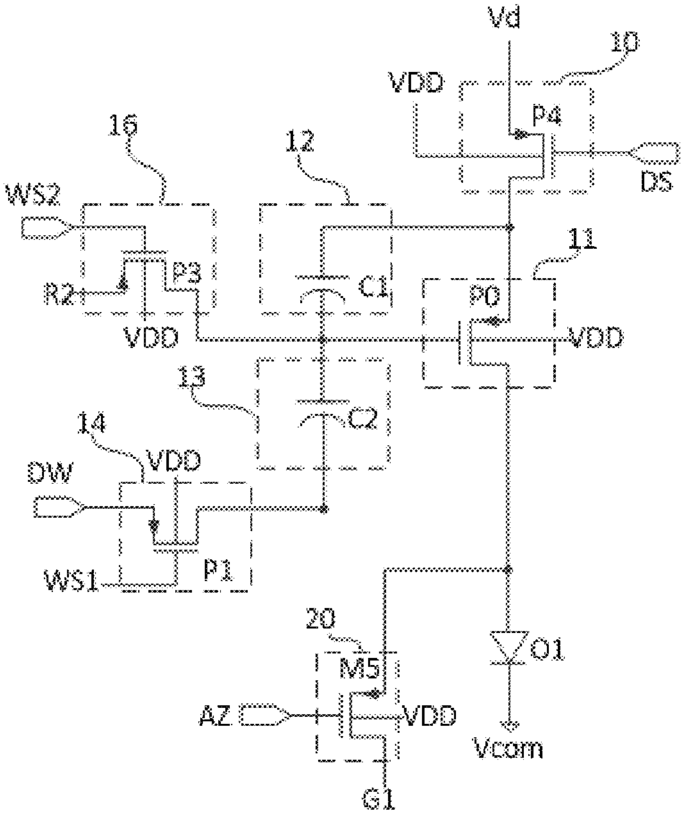
FIG. 17 is a circuit diagram of a pixel circuit according to at least one embodiment of the present disclosure.

As shown in FIG. 17, on the basis of at least one embodiment of the pixel circuit shown in FIG. 16, the pixel circuit further includes a writing-in control circuit 14, a second control circuit 10, a third control circuit 20 and a reference voltage writing-in circuit 16;

The first energy storage circuit 12 includes a first capacitor C1; the second energy storage circuit 13 includes a second capacitor C2; the writing-in control circuit 14 includes a first transistor P1; the driving circuit 11 includes a driving transistor P0, the first control circuit 15 includes a second transistor P2; the second control circuit 10 includes a fourth transistor P4; the third control circuit 20 includes a fifth transistor M5; the reference voltage writing-in circuit 16 includes a third transistor P3; the light emitting element is an organic light emitting diode O1;

The first terminal of the first capacitor C1 is electrically connected to the gate electrode of the driving transistor P0, and the second terminal of the first capacitor C1 is electrically connected to the source electrode of the driving transistor P0;

The first terminal of the second capacitor C2 is electrically connected to the gate electrode of the driving transistor P0;

The gate electrode of the first transistor P1 is electrically connected to the first writing-in control terminal WS1, the source electrode of the first transistor P1 is electrically connected to the writing-in terminal DW, and the drain electrode of the first transistor P1 is electrically connected to the second terminal of the second capacitor C2; the back gate electrode of the first transistor P1 is electrically connected to a high voltage terminal; the high voltage terminal is used to provide a high voltage VDD;

The gate electrode of the third transistor P3 is electrically connected to the second writing-in control terminal WS2, the source electrode of the third transistor P3 is electrically connected to the reference voltage terminal R2, and the drain electrode of the third transistor P3 is electrically connected to the gate electrode of the driving transistor P0; the back gate electrode of the third transistor is electrically connected to the high voltage terminal; the reference voltage terminal R2 is used to provide a reference voltage Vref;

The gate electrode of the fourth transistor P4 is electrically connected to the first control terminal DS, the source electrode of the fourth transistor P4 is electrically connected to the power supply voltage terminal Vd, and the drain electrode of the fourth transistor P4 is electrically connected to the source electrode of the driving transistor P0; the back gate electrode of the fourth transistor P4 is electrically connected to the high voltage terminal; the power supply voltage terminal Vd is used to provide a power supply voltage ELVDD;

The gate electrode of the fifth transistor M5 is electrically connected to the second control terminal AZ, the source electrode of the fifth transistor M5 is electrically connected to the ground terminal G1, and the drain electrode of the fifth transistor M5 is electrically connected to the anode of the organic light emitting diode O1; the back gate electrode of the fifth transistor M5 is electrically connected to the high voltage terminal;

The cathode of the OLED O1 is connected to the common electrode voltage Vcom.

In at least one embodiment of the pixel circuit shown in FIG. 17, the fourth voltage terminal is the high voltage terminal, the first voltage terminal is connected to the common electrode voltage Vcom, and the third voltage terminal is the ground terminal G1.

In at least one embodiment of the present disclosure, ELVDD−Vref is greater than or equal to 1.5V, and the value range of ELVDD may be greater than or equal to 2V and less than or equal to 8V, but it is not limited thereto.

In at least one embodiment of the pixel circuit shown in FIG. 17, all transistors are PMOS transistors, but not limited thereto.

In at least one embodiment of the pixel circuit shown in FIG. 17 of the present disclosure, the driving transistor P0 is equivalent to a current source controlled by the gate voltage, so as to realize direct control of the driving current flowing through O1 by the data voltage Vdata, so the pixel circuit shown in FIG. 17 of at least one embodiment of the present disclosure is a current-type pixel circuit.

In at least one embodiment of the pixel circuit shown in FIG. 17 of the present disclosure, the data voltage Vdata is divided by C1 and C2 and written into the gate electrode of the driving transistor P0, so as to expand the dynamic range of the data voltage Vdata, which is beneficial to the design of the DAC in the source driver and the uniformity of the data line output.

Figure 18:
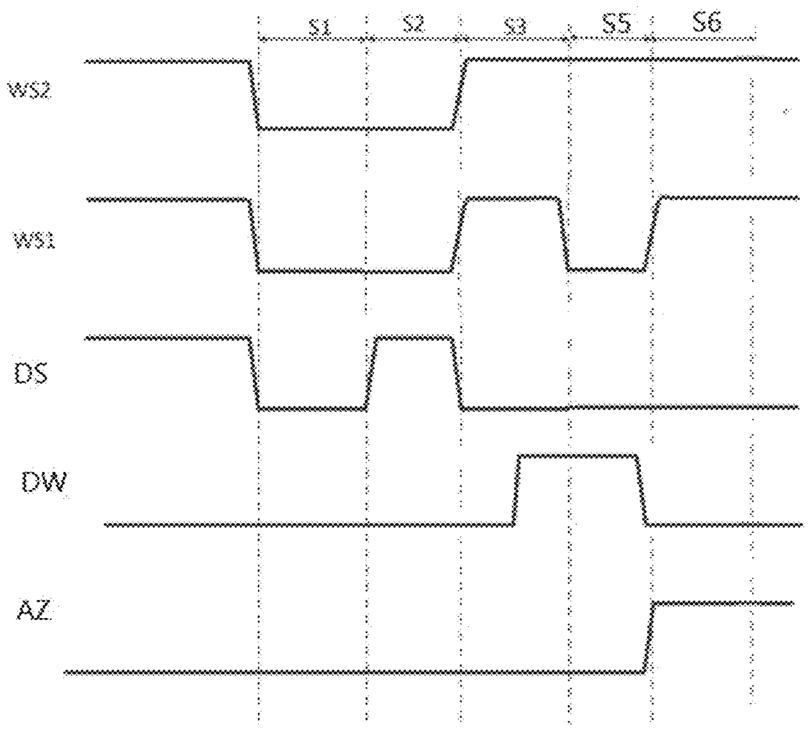
FIG. 18 is a working timing diagram of the pixel circuit shown in FIG. 17 of at least one embodiment of the present disclosure.

As shown in FIG. 18, when at least one embodiment of the pixel circuit shown in FIG. 17 of the present disclosure is in operation, the display period includes an initialization phase S1, a self-discharge phase S2, a data preparation phase S3, a data writing-in phase S5 and a light emitting phase S6;

In the initialization phase S1, WS1 provides a low voltage signal, WS2 provides a low voltage signal, DS provides a low voltage signal, AZ provides a low voltage signal, R2 provides a reference voltage Vref, DW provides a reference voltage Vref, P1M5 is turned on, P1 is turned off, P4 is turned on, P3 is turned on, the source electrode of P0 is connected to the power supply voltage ELVDD, the gate electrode of P0 is connected to the reference voltage Vref, the drain electrode of P0 is connected to the ground terminal G1, and ELVDD−Vref is greater than |Vth|, so that at the beginning of the self-discharge phase S2, P0 can be turned on; wherein, Vth is the threshold voltage of P0 without the back gate effect;

In the self-discharge phase S2, AZ provides a low voltage signal, WS1 provides a low voltage signal, WS2 provides a low voltage signal, DS provides a high voltage signal, R2 provides a reference voltage Vref, DW provides a reference voltage Vref, M5 is turned on, so that the drain electrode of P0 is connected to the ground terminal G1; P3 is turned on, so that the gate electrode of P0 is connected to the reference voltage Vref; P1 is turned on, and P4 is turned off;

At the beginning of the self-discharge phase S2, P0 is turned on and discharged through P0 and M5, so that the source potential Vs of P0 drops, and as Vs drops, a back gate effect occurs, and |Vth_ef| is equal to a×(VDD−Vs)+|Vth|, wherein, Vth_ef is the threshold voltage of P0 with back gate effect, a is the coefficient of back gate effect; as Vs decreases, Vgs decreases synchronously, when |Vth_ef| increases to be equal to |Vgs|, P0 is turned off and stops discharging; at this time, $$a\times(VDD-Vs)+|Vth|=Vg-Vs;\ Vs=\frac{Vref-a\times VDD-|Vth|}{1-a};\ Vg=Vref;$$

wherein Vg is the gate voltage of P0, Vs is the source voltage of P0;

$$|Vgs|=\frac{a\times Vref-a\times VDD-|Vth|}{1-a};$$

In the data preparation phase S3, WS1 provides a high voltage signal, WS2 provides a high voltage signal, DS provides a low voltage signal, AZ provides a low voltage signal, P1 and P3 are turned off, P4 is turned on, M5 is turned on, and the source potential Vs of P0 is pulled up to ELVDD;

In the data preparation phase S3, Vg changes from Vref to $$ELVDD-\frac{a\times Vref-a\times VDD-|Vth|}{1-a};$$

In the data writing-in phase S5, WS1 provides a low voltage signal, WS2 provides a high voltage signal, EM provides a low voltage signal, DW provides a data voltage Vdata, AZ provides a low voltage signal, P3 is turned off, P4 is turned on, M5 is turned on, P1 is turned on to write the data voltage Vdata into the gate electrode of P0, b=C2*z*/(C1*z*+C2*z*), wherein C1*z* is the capacitance value of C1, C2*z* is the capacitance value of C2; ΔVg is the change value of the gate voltage of P0;

$$\Delta Vg=\left(Vdata-ELVDD+\frac{a\times Vref-a\times VDD-|Vth|}{1-a}\right)\times b;$$

$$Vg=ELVDD-\frac{a\times Vref-a\times VDD-|Vth|}{1-a}+\left(Vdata-ELVDD+\frac{a\times Vref-a\times VDD-|Vth|}{1-a}\right)\times b;$$

$$|Vgs|=-b\times Vdata+b\times ELVDD-\frac{(b-1)\times a}{1-a}\times Vref+\frac{(b-1)\times a}{1-a}\times VDD+\frac{(b-1)}{1-a}\times|Vth|;$$

In the light emitting phase S6, WS2 and WS1 provide a high voltage signal, DS provides a low voltage signal, AZ provides a high voltage signal, P3, P1 and M5 are turned off, P4 is turned on, and P0 drives O1 to emit light;

In the light emitting phase S6, $$\begin{aligned}Io1&=K(|Vgs|-|Vth|)^2\\&=K\left(-b\times Vdata+b\times ELVDD-\frac{(b-1)\times a}{1-a}\times Vref+\frac{(b-1)\times a}{1-a}\times VDD+\frac{(b-1)}{1-a}\times|Vth|-|Vth|\right)^2\end{aligned}$$

It can be seen from the above formula that when (b−1)/(1−a) is equal to 1, Io1 is not related to Vth.

It can be known from the above working process that when at least one embodiment of the pixel circuit shown in FIG. 17 is in operation, in the light emitting phase, the gate-source voltage of the driving transistor P0 can compensate the threshold voltage of the driving transistor, so that the light emitting current of the organic light emitting diode O1 is not related to the threshold voltage Vth, thereby improving display uniformity.

At least one embodiment of the pixel circuit shown in FIG. 17 of the present disclosure is a current-type pixel circuit using all PMOS transistors, which has a wider anode dynamic range than a current-type pixel circuit including NMOS transistors under the same process platform. The reasons are as follows.

For a current-type pixel circuit including NMOS transistors, when the voltage of the anode of the organic light emitting diode O1 is set to a negative voltage, the negative voltage will be connected to the source electrode or drain electrode of the transistor in the pixel circuit, when the transistor is an n-type transistor, there is a forward-biased diode between the back gate electrode and the source electrode of the transistor, which causes a latch-up effect and makes the pixel circuit work abnormally. Therefore, the current-mode pixel circuit using a PMOS transistor has a wider anode dynamic range, when the transistors in the current-mode pixel circuit are all PMOS transistors, the potential of the anode of the organic light emitting diode O1 may be a negative voltage.

At least one embodiment of the pixel circuit shown in FIG. 17 of the present disclosure adopts a current-type pixel driving method, and the driving transistor included in the driving circuit in at least one embodiment of the pixel circuit shown in FIG. 17 of the present disclosure is a PMOS transistor, when the anode of O1 and the cathode of O1 are short-circuited, the dot-strip-line defect will not occur because the anode voltage of O1 is negative.

At least one embodiment of the pixel circuit shown in FIG. 17 of the present disclosure can prevent the N-type base substrate of the first transistor P1 used to transmit the data voltage from leaking to the drain electrode of the first transistor P1 to the first capacitor C1, thus the low-grayscale bright spot phenomenon occurs for the following reasons.

The transistor used in at least one embodiment of the pixel circuit shown in FIG. 17 in the present disclosure is a PMOS transistor. Therefore, in the non-light emitting phase, even if the N-type base substrate of the first transistor P1 leaks current to the drain electrode of the first transistor P1 to the first capacitor C1 to increase the potential of the gate electrode of P0, since the driving transistor P0 is also a PMOS transistor, it will not increase the brightness of the organic light emitting diode, and no bright spots will occur.

In related art, P0 is an NMOS transistor, and the higher the potential of the gate electrode of P0 is, the brighter the organic light emitting diode is. Therefore, in the non-light emitting period, the drain electrode of P1 leaks current to the first capacitor C1, which will increase the potential of the gate electrode of P0, so that the brightness of the organic light emitting diode increases, and bright spots appear. Based on this, at least one embodiment of the present disclosure sets the transistor as a PMOS transistor to solve the above problem.

At least one embodiment of the pixel circuit shown in FIG. 17 of the present disclosure is a current-type pixel circuit, which can compensate for the lifetime attenuation caused by the increase of the internal resistance of the organic light emitting diode O1, and in the pixel circuit shown in FIG. 17 of the present disclosure, the back gate electrode of each transistor is connected to the high voltage VDD, but not connected to ELVDD, so that the potential of base substrate nwell potential of each transistor is separated from ELVDD, so that ELVDD can be flexibly set in a range less than VDD.

At least one embodiment of the pixel circuit shown in FIG. 17 of the present disclosure may be a current-type pixel circuit applied to a silicon-based OLED micro-display chip, but not limited thereto. At least one embodiment of the present disclosure is based on a specific semiconductor process platform. Only PMOS transistors are used for pixel circuit design, which overcomes the space of MOS transistors limited by the design rule in the pixel circuit where PMOS transistors and NMOS transistors coexist. It can effectively decrease the pixel area and increase Pixels Per Inch (PPI, the number of pixels per inch).

The display panel described in the embodiments of the present disclosure includes a plurality of rows and a plurality of columns of the pixel circuits.

In at least one embodiment of the present disclosure, the display panel may further include a plurality of columns of data lines;

The writing-in terminals of the pixel circuits in the same column are electrically connected to the data lines in the same column, and the second energy storage circuit includes a second capacitor;

The second capacitor may be a parasitic capacitance between the data line and the signal line arranged on the same layer as the second capacitor, so as to save layout space.

In at least one embodiment of the present disclosure, the display panel includes a valid display area and a peripheral area, and the peripheral area surrounds the valid display area; the pixel circuit includes a first control circuit;

The first control circuit and the second energy storage circuit are arranged in the peripheral area, and the components included in the pixel circuit other than the first control circuit and the second energy storage circuit are arranged in the valid display area.

During specific implementation, the first control circuit and the second energy storage circuit may be located in the peripheral area, and each column of pixel circuits may share one first control circuit and one second energy storage circuit, so as to realize a narrow frame; and in the valid display area, one pixel circuit only includes one capacitor, which can effectively reduce the process requirements of the circuit.

In at least one embodiment of the present disclosure, a row of pixel circuits included in the display panel share one first control circuit and one second energy storage circuit;

The display panel includes M rows and N columns of pixel circuits, where M and N are integers greater than 1;

The display panel includes N shared units; the nth shared unit includes an nth first control circuit and an nth second energy storage circuit;

In the valid display area of the display panel, the pixel circuit in the mth row and nth column includes a light emitting element in the mth row and nth column, a driving circuit in the mth row and mth column, a first energy storage circuit in the mth row and nth column, a writing-in control circuit in the mth row and nth column and a first control circuit in the mth row and nth column;

The nth first control circuit is electrically connected to the first control terminal, the first terminal of the nth second energy storage circuit, and the second terminal of the nth second energy storage circuit, is configured to control to connect or disconnect the first terminal of the nth second energy storage circuit and the second terminal of the nth second energy storage circuit under the control of the first control signal provided by the first control terminal;

The writing-in control circuit in the mth row and nth column is electrically connected to the first writing-in control terminal, the control terminal of driving circuit in the mth row and nth column and the first terminal of the nth second energy storage circuit respectively, is configured to control to connect or disconnect the control terminal of the driving circuit in the mth row and nth column and the first terminal of the nth second energy storage circuit under the control of the writing-in control signal provided by the first writing-in control terminal;

The second terminal of the nth second energy storage circuit is electrically connected to the nth writing-in terminal; the nth second energy storage circuit is used to store electric energy; n is a positive integer less than or equal to N, and m is a positive integer less than or equal to M.

Figure 19:
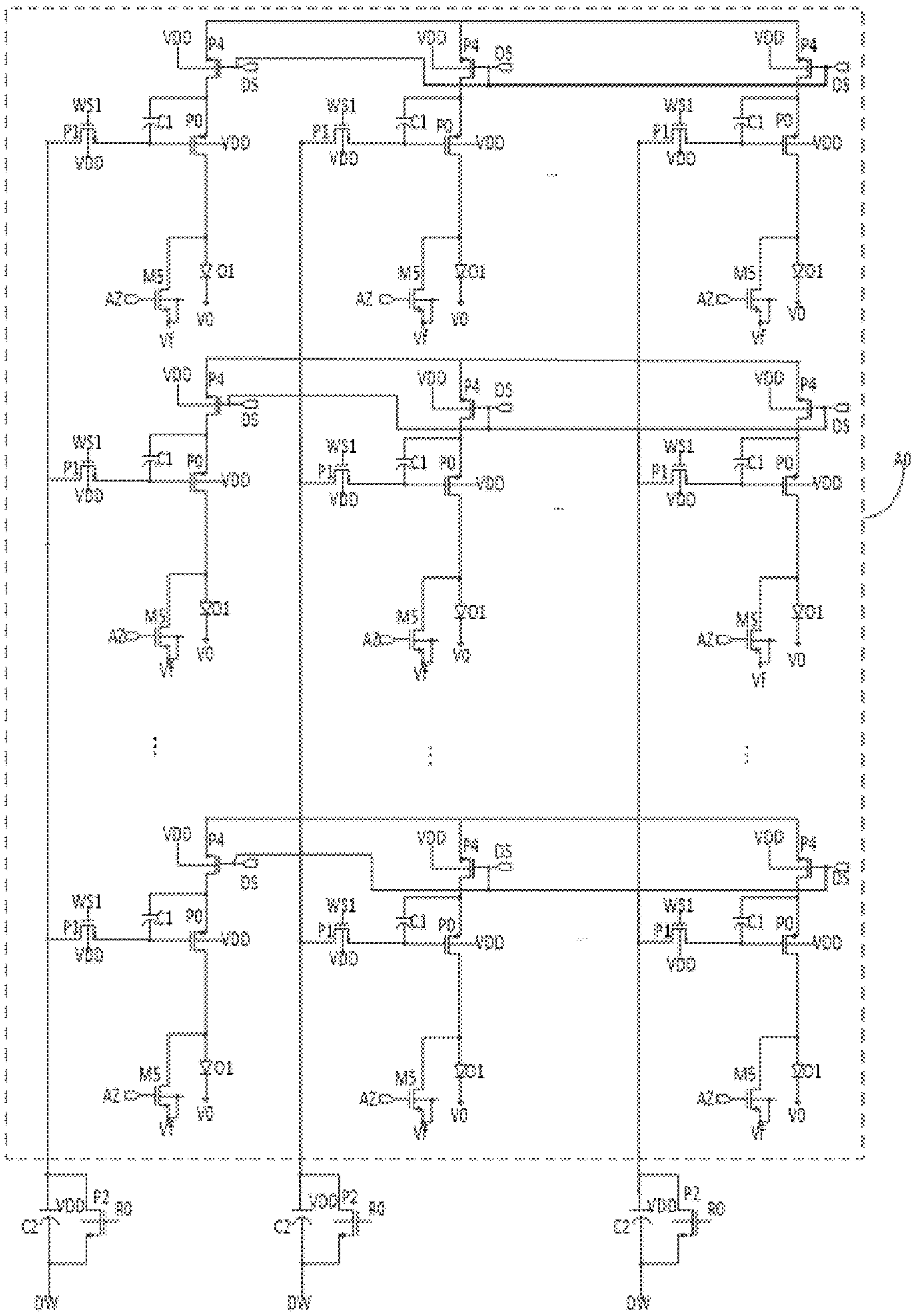
FIG. 19 is a schematic diagram of the second transistor and the second capacitor shared by each row of pixel circuits in the display panel according to at least one embodiment of the present disclosure.

As shown in FIG. 19, the one labeled A0 is the valid display area, and the devices included in the plurality of rows and a plurality of columns of pixel circuits other than the second transistor P2 and the second capacitor C2 are arranged in the valid display area A0;

The second transistor P2 and the second capacitor C2 are arranged outside the valid display area A0, and the second transistor P2 and the second capacitor C2 are arranged below the valid display area A0;

A column of pixel circuits shares one second transistor P2 and one second capacitor C2.

The driving method described in at least one embodiment of the present disclosure is applied to the above-mentioned pixel circuit, and the driving method includes:

Controlling, by the writing-in control circuit, to connect or disconnect the first terminal of the first energy storage circuit and the first terminal of the second energy storage circuit under the control of the first writing-in control signal;

Generating, by the driving circuit, a driving current for driving the light emitting element under the control of the potential of the control terminal of the driving circuit.

In at least one embodiment of the present disclosure, the display period of the pixel circuit includes an initialization phase, a self-discharge phase, a data preparation phase, a potential control phase, a data writing-in phase, and a light emitting phase that are set successively; the driving method includes:

In the initialization phase, the self-discharging phase and the data writing-in phase, controlling, by the writing-in control circuit, to connect the first terminal of the first energy storage circuit and the first terminal of the second energy storage circuit under the control of the first writing-in control signal;

In the data preparation phase, the potential control phase and the light emitting phase, controlling, by the writing-in control circuit, to disconnect the first terminal of the first energy storage circuit from the first terminal of the second energy storage circuit under the control of the first writing-in control signal.

In at least one embodiment of the present disclosure, the pixel circuit further includes a first control circuit; the driving method further includes:

In the initialization phase, the self-discharging phase, the data preparation phase and the light emitting phase, controlling, by the first control circuit, to connect the first terminal of the second energy storage circuit and the second terminal of the second energy storage circuit under the control of the first control signal;

In the potential control phase and the data writing-in phase, controlling, by the first control circuit, to connect the first terminal of the second energy storage circuit and the second terminal of the second energy storage circuit under the control of the first control signal.

The driving method described in at least one embodiment of the present disclosure is applied to the above-mentioned pixel circuit, and the driving method includes:

Controlling, by the first control circuit, to connect or disconnect the first terminal of the second energy storage circuit and the second terminal of the second energy storage circuit under the control of the first control signal;

Generating, by the driving circuit, a driving current for driving the light emitting element under the control of the potential of the control terminal of the driving circuit.

In at least one embodiment of the present disclosure, the display period of the pixel circuit includes an initialization phase, a self-discharge phase, a data preparation phase, a potential control phase, a data writing-in phase, and a light emitting phase that are set successively; the driving method includes:

In the initialization phase, the self-discharging phase, the data preparation phase and the light emitting phase, controlling, by the first control circuit, to connect the first terminal of the second energy storage circuit and the second terminal of the second energy storage circuit under the control of the first control signal;

In the potential control phase and the data writing-in phase, controlling, by the first control circuit, to disconnect the first terminal of the second energy storage circuit and the second terminal of the second energy storage circuit under the control of the first control signal.

In at least one embodiment of the present disclosure, the pixel circuit further includes a writing-in control circuit; the driving method further includes:

In the initialization phase, the self-discharging phase and the data writing-in phase, controlling, by the writing-in control circuit, to connect the first terminal of the first energy storage circuit and the first terminal of the second energy storage circuit under the control of the first writing-in control signal;

In the data preparation phase, the potential control phase and the light emitting phase, controlling, by the writing-in control circuit, to disconnect the first terminal of the first energy storage circuit and the first terminal of the second energy storage circuit under the control of the first writing-in control signal.

The display device described in the embodiment of the present disclosure includes the above-mentioned display panel.

In at least one embodiment of the present disclosure, the display panel includes a first silicon substrate, and a pixel circuit and a gate driving circuit arranged on the first silicon substrate;

The display device further includes a second silicon substrate, and a display driver chip arranged on the second silicon substrate.

Figure 20:
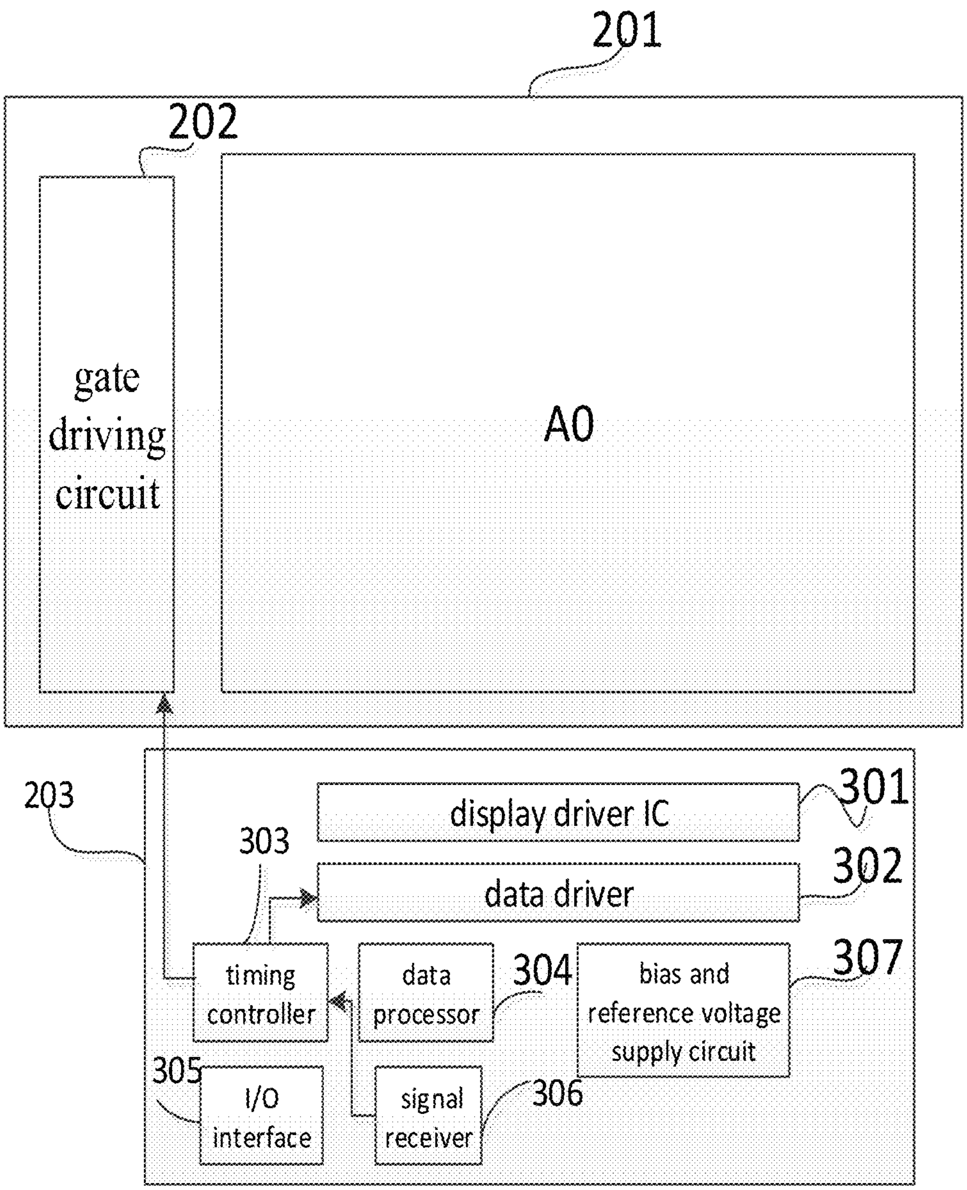
FIG. 20 is a structural diagram of a display device according to at least one embodiment of the present disclosure.

In specific implementation, the area of the first silicon substrate is larger than the area of the second silicon substrate;

The minimum width of the signal lines included in the display panel is greater than the width of the signal lines included in the display driver chip. As shown in FIG. 20, the display panel includes a first silicon substrate 201, and a pixel circuit and a gate driving circuit 202 arranged on the first silicon substrate 201; in FIG. 20, the one labeled A0 is the valid display area, the pixel circuit is arranged in the valid display area;

The display device further includes a second silicon substrate 203 and a display driver chip arranged on the second silicon substrate 203.

As shown in FIG. 20, the display driver chip may include a display driver integrated circuit 301, a source driver 302, a timing controller 303, a data processor 304, an input and output interface 305, a signal receiver 306, and a bias and reference voltage supply circuit 307; but not limited thereto.

In at least one embodiment of the present disclosure, the area of the first silicon substrate is larger than the area of the second silicon substrate;

The minimum width of the signal lines included in the display panel is greater than the width of the signal lines included in the display driver chip.

In at least one embodiment of the present disclosure, different processes are used to manufacture the display panel and the display driver chip. For example, the display panel can be manufactured by using a 100 nm process, and the display driver chip can be manufactured by a 28 nm process. In order to make the line width of the signal lines included in the display driver chip smaller than the line width of the signal lines included in the display panel, the distance between the signal lines included in the display driver chip is smaller than the distance between the signal lines included in the display panel.

The display device provided by the embodiments of the present disclosure may be any product or component with a display function, such as a mobile phone, a tablet computer, a television, a monitor, a notebook computer, a digital photo frame, a navigator, and the like.

The above embodiments are for illustrative purposes only, but the present disclosure is not limited thereto. Obviously, those skilled in the art may make further modifications and improvements without departing from the spirit of the present disclosure, and these modifications and improvements shall also fall within the scope of the present disclosure.

What is claimed is:

1. A pixel circuit, comprising a light emitting element, a driving circuit, a first energy storage circuit, a second energy storage circuit, and a writing-in control circuit; wherein a first terminal of the first energy storage circuit is electrically connected to a control terminal of the driving circuit and a first terminal of the writing-in control circuit respectively, and a second terminal of the first energy storage circuit is electrically connected to a first terminal of driving circuit, a first terminal of the second energy storage circuit is electrically connected to a second terminal of the writing-in control circuit, and a second terminal of the second energy storage circuit is electrically connected to a writing-in terminal; the first energy storage circuit and the second energy storage circuit are used to store electrical energy;

a control terminal of the writing-in control circuit is electrically connected to a first writing-in control terminal, and the writing-in control circuit is configured to control to connect or disconnect the first terminal of the first energy storage circuit and the first terminal of the second energy storage circuit under the control of a first writing-in control signal provided by the first writing-in control terminal;

a second terminal of the driving circuit is electrically connected to the light emitting element, and the driving circuit is configured to generate a driving current for driving the light emitting element under the control of a potential of the control terminal of the driving circuit;

the pixel circuit further comprises a first control circuit; wherein the first control circuit is electrically connected to a first control terminal, the first terminal of the second energy storage circuit, and the second terminal of the second energy storage circuit, is configured to control to connect or disconnect the first terminal of the second energy storage circuit and the second terminal of the second energy storage circuit under the control of a first control signal provided by the first control terminal.

2. The pixel circuit according to claim 1, further comprising a second control circuit;

the second control circuit is electrically connected to a second control terminal, a power supply voltage terminal and the first terminal of the driving circuit, and is configured to control to connect or disconnect the power supply voltage terminal and the first terminal of the driving circuit under the control of a second control signal provided by the second control terminal.

3. The pixel circuit according to claim 2, wherein the second terminal of the driving circuit is electrically connected to a first electrode of the light emitting element, and a second electrode of the light emitting element is electrically connected to a first voltage terminal;

the power supply voltage terminal is used to provide a power supply voltage, and the first voltage terminal is used to provide a first voltage signal;

an absolute value of a voltage value of the power supply voltage is smaller than an absolute value of a voltage value of the first voltage signal.

4. The pixel circuit according to claim 1, further comprising a third control circuit; wherein the second terminal of the driving circuit is electrically connected to the first electrode of the light emitting element, and the second electrode of the light emitting element is electrically connected to a first voltage terminal;

the third control circuit is electrically connected to a third control terminal, a third voltage terminal and the first electrode of the light emitting element, and is configured to control to write a third voltage signal provided by the third voltage terminal into the first electrode of the light emitting element under the control of a third control signal provided by the third control terminal.

5. The pixel circuit according to claim 1, further comprising a reference voltage writing-in circuit; wherein the reference voltage writing-in circuit is electrically connected to a second writing-in control terminal, a reference voltage terminal and a writing-in node respectively, and is configured to write a reference voltage provided by the reference voltage terminal into the writing-in node under the control of a second writing-in control signal provided by the second writing-in control terminal;

the writing-in node is electrically connected to the control terminal of the driving circuit, or the writing-in node is electrically connected to the first terminal of the second energy storage circuit.

6. The pixel circuit according to claim 1, further comprising a resistor circuit; wherein a first terminal of the resistor circuit is electrically connected to the second terminal of the driving circuit, and a second terminal of the resistor circuit is electrically connected to the first electrode of the light emitting element;

the second electrode of the light emitting element is electrically connected to a first voltage terminal.

7. The pixel circuit according to claim 1, wherein the first energy storage circuit includes a first capacitor, and the second energy storage circuit includes a second capacitor;

a first terminal of the first capacitor is electrically connected to the control terminal of the driving circuit and the first terminal of the writing-in control circuit, and a second terminal of the first capacitor is connected to the first terminal of the driving circuit; a first terminal of the second capacitor is electrically connected to the second terminal of the writing-in control circuit, and a second terminal of the second capacitor is electrically connected to the writing-in terminal;

a capacitance value of the second capacitor is smaller than a capacitance value of the first capacitor.

8. The pixel circuit according to claim 1, wherein the writing-in control circuit comprises a first transistor;

a control electrode of the first transistor is electrically connected to the first writing-in control terminal, a first electrode of the first transistor is electrically connected to the control terminal of the driving circuit, and a second electrode of the first transistor is electrically connected to the first terminal of the second energy storage circuit; a back gate electrode of the first transistor is electrically connected to the second voltage terminal.

9. The pixel circuit according to claim 1, wherein the first control circuit comprises a second transistor;

a control electrode of the second transistor is electrically connected to the first control terminal, a first electrode of the second transistor is electrically connected to the first terminal of the second energy storage circuit, and a second electrode of the second transistor is electrically connected to the second terminal of the second energy storage circuit; a back gate electrode of the second transistor is electrically connected to the second voltage terminal.

10. The pixel circuit according to claim 5, wherein the reference voltage writing-in circuit comprises a third transistor;

a control electrode of the third transistor is electrically connected to the second writing-in control terminal, a first electrode of the third transistor is electrically connected to the reference voltage terminal, and a second electrode of the third transistor is electrically connected to the writing-in node; a back gate electrode of the third transistor is electrically connected to the second voltage terminal.

11. The pixel circuit according to claim 2, wherein the second control circuit comprises a fourth transistor; the driving circuit comprises a driving transistor;

a control electrode of the fourth transistor is electrically connected to the second control terminal, a first electrode of the fourth transistor is electrically connected to the power supply voltage terminal, and a second electrode of the fourth transistor is electrically connected to the first terminal of the driving circuit; a back gate electrode of the fourth transistor is electrically connected to the second voltage terminal;

a control electrode of the driving transistor is the control terminal of the driving circuit, a first electrode of the driving transistor is the first terminal of the driving circuit, and a second electrode of the driving transistor is electrically connected to the second terminal of the driving circuit; a back gate electrode of the driving transistor is electrically connected to the second voltage terminal.

12. The pixel circuit according to claim 4, wherein the third control circuit comprises a fifth transistor;

a control electrode of the fifth transistor is electrically connected to the third control terminal, a first electrode of the fifth transistor is electrically connected to the third voltage terminal, and a second electrode of the fifth transistor is electrically connected to the first electrode of the light emitting element; a back gate electrode of the fifth transistor is electrically connected to a fourth voltage terminal;

wherein the fifth transistor is an n-type transistor; the fourth voltage terminal is the third voltage terminal;

a deep n hydrazine is arranged between the back gate electrode of the fifth transistor and a P-type base substrate to isolate the back gate electrode of the fifth transistor from the P-type base substrate; the base gate electrode of the fifth transistor and the first electrodes of the fifth transistors are all electrically connected to the third voltage terminal;

the pixel circuit further includes an n hydrazine and a p hydrazine;

a doping concentration of the n hydrazine is greater than a doping concentration of the deep n hydrazine;

a ratio of a thickness of the n hydrazine to a thickness of the deep n hydrazine is greater than or equal to 0.4 and less than or equal to 0.6;

a ratio of a thickness of the p hydrazine to the thickness of the deep n hydrazine is greater than or equal to 0.4 and less than or equal to 0.6.

13. A pixel circuit, comprising a light emitting element, a driving circuit, a first energy storage circuit, a second energy storage circuit, and a first control circuit;

a first terminal of the first energy storage circuit is electrically connected to a control terminal of the driving circuit, and a second terminal of the first energy storage circuit is electrically connected to a first terminal of the driving circuit; a first terminal of the second energy storage circuit is electrically connected to the control terminal of the driving circuit, and a second terminal of the second energy storage circuit is electrically connected to a writing-in terminal; the first energy storage circuit and the second energy storage circuit are used for storing electrical energy;

the first control circuit and the second energy storage circuit are connected in parallel, and the first control circuit is configured to control to connect or disconnect the first terminal of the second energy storage circuit the and the second terminal of the second energy storage circuit under the control of a first control signal provided by a first control terminal;

a second terminal of the driving circuit is electrically connected to a light emitting element, and the driving circuit is configured to generate a driving current for driving the light emitting element under the control of a potential of the control terminal of the driving circuit.

14. A display panel comprising a plurality of rows and a plurality of columns of pixel circuits according to claim 1.

15. The display panel according to claim 14, further comprising a plurality of columns of data lines; wherein writing-in terminals of pixel circuits in a same column are electrically connected to data lines in a same column, and the second energy storage circuit includes a second capacitor;

the second capacitor is a parasitic capacitor between the data line and a signal line arranged on a same layer as the second capacitor.

16. The display panel according to claim 14, wherein the display panel includes a valid display area and a peripheral area, and the peripheral area surrounds the valid display area;

the first control circuit and the second energy storage circuit are arranged in the peripheral area, and components included in the pixel circuit other than the first control circuit and the second energy storage circuit are arranged in the valid display area.

17. The display panel according to claim 16, wherein a column of pixel circuits included in the display panel share one first control circuit and one second energy storage circuit;

the display panel includes M rows and N columns of pixel circuits, wherein M and N are integers greater than 1;

the display panel includes N shared units; an nth shared unit includes an nth first control circuit and an nth second energy storage circuit;

in the valid display area of the display panel, a pixel circuit in the mth row and nth column includes a light emitting element in the mth row and nth column, a driving circuit in the mth row and mth column, a first energy storage circuit in the mth row and nth column, a writing-in control circuit in the mth row and nth column and a first control circuit in the mth row and nth column;

the nth first control circuit is electrically connected to the first control terminal, a first terminal of the nth second energy storage circuit, and a second terminal of the nth second energy storage circuit, is configured to control to connect or disconnect the first terminal of the nth second energy storage circuit and the second terminal of the nth second energy storage circuit under the control of the first control signal provided by the first control terminal;

the writing-in control circuit in the mth row and nth column is electrically connected to the first writing-in control terminal, the control terminal of driving circuit in the mth row and nth column and the first terminal of the nth second energy storage circuit respectively, is configured to control to connect or disconnect the control terminal of the driving circuit in the mth row and nth column and the first terminal of the nth second energy storage circuit under the control of the writing-in control signal provided by the first writing-in control terminal;

the second terminal of the nth second energy storage circuit is electrically connected to the nth writing-in terminal; the nth second energy storage circuit is used to store electric energy;

n is a positive integer less than or equal to N, and m is a positive integer less than or equal to M.

18. A driving method applied to the pixel circuit according to claim 1, comprising:

controlling, by the writing-in control circuit, to connect or disconnect the first terminal of the first energy storage circuit and the first terminal of the second energy storage circuit under the control of the first writing-in control signal;

generating, by the driving circuit, a driving current for driving the light emitting element under the control of the potential of the control terminal of the driving circuit.

19. The driving method according to claim 18, wherein a display period of the pixel circuit includes an initialization phase, a self-discharge phase, a data preparation phase, a potential control phase, a data writing-in phase, and a light emitting phase that are set successively; the driving method includes:

in the initialization phase, the self-discharging phase and the data writing-in phase, controlling, by the writing-in control circuit, to connect the first terminal of the first energy storage circuit and the first terminal of the second energy storage circuit under the control of the first writing-in control signal;

in the data preparation phase, the potential control phase and the light emitting phase, controlling, by the writing-in control circuit, to disconnect the first terminal of the first energy storage circuit from the first terminal of the second energy storage circuit under the control of the first writing-in control signal.

20. The driving method according to claim 19, wherein the driving method further comprises:

in the initialization phase, the self-discharging phase, the data preparation phase and the light emitting phase, controlling, by the first control circuit, to connect the first terminal of the second energy storage circuit and the second terminal of the second energy storage circuit under the control of the first control signal;

in the potential control phase and the data writing-in phase, controlling, by the first control circuit, to connect the first terminal of the second energy storage circuit and the second terminal of the second energy storage circuit under the control of the first control signal.

21. A driving method applied to the pixel circuit according to claim 13, the driving method comprising:

controlling, by the first control circuit, to connect or disconnect the first terminal of the second energy storage circuit and the second terminal of the second energy storage circuit under the control of the first control signal;

generating, by the driving circuit, a driving current for driving the light emitting element under the control of the potential of the control terminal of the driving circuit.

22. A display device comprising the display panel according to claim 14.

23. The display device according to claim 22, wherein the display panel comprises a first silicon substrate, and a pixel circuit and a gate driving circuit arranged on the first silicon substrate;

the display device further includes a second silicon substrate, and a display driver chip arranged on the second silicon substrate;

wherein an area of the first silicon substrate is larger than an area of the second silicon substrate;

a minimum width of signal lines included in the display panel is greater than a width of signal lines included in the display driver chip.

* * * * *